(12) United States Patent
Sun et al.

(10) Patent No.: US 9,229,924 B2
(45) Date of Patent: Jan. 5, 2016

(54) WORD DETECTION AND DOMAIN DICTIONARY RECOMMENDATION

(75) Inventors: Hao Sun, Beijing (CN); Chi-Ho Li, Beijing (CN); Jing Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 13/594,473

(22) Filed: Aug. 24, 2012

(65) Prior Publication Data

US 2014/0058722 A1  Feb. 27, 2014

(51) Int. Cl.
*G06F 17/27* (2006.01)
*G06F 17/20* (2006.01)
*G06F 17/21* (2006.01)

(52) U.S. Cl.
CPC .......... *G06F 17/2735* (2013.01); *G06F 17/277* (2013.01)

(58) Field of Classification Search
CPC ....................................................... G06F 17/28
USPC .................................................. 704/1, 9, 10
See application file for complete search history.

(56) References Cited

U.S. PATENT DOCUMENTS

| | | |
|---|---|---|
| 5,297,039 A | 3/1994 | Kanaegami et al. |
| 5,418,948 A | 5/1995 | Turtle |
| 5,469,355 A | 11/1995 | Tsuzuki |
| 5,717,913 A | 2/1998 | Driscoll |
| 5,805,911 A | 9/1998 | Miller |
| 5,926,808 A | 7/1999 | Evans et al. |
| 6,006,225 A | 12/1999 | Bowman et al. |
| 6,012,055 A | 1/2000 | Campbell et al. |
| 6,098,034 A | 8/2000 | Razin et al. |
| 6,128,613 A * | 10/2000 | Wong et al. .................. 707/738 |
| 6,137,911 A | 10/2000 | Zhilyaev |
| 6,269,368 B1 | 7/2001 | Diamond |

(Continued)

FOREIGN PATENT DOCUMENTS

| | | |
|---|---|---|
| WO | 02/29627 A2 | 4/2002 |
| WO | 2006/123918 A1 | 11/2006 |
| WO | 2013/133985 A1 | 9/2013 |

OTHER PUBLICATIONS

Nie, Jian-Yun et al., "Unknown word detection and segmentation of Chinese using statistical and heuristic knowledge," Communications of COLIPS, vol. 5, No. 1-2, pp. 47-57 (1995).

(Continued)

*Primary Examiner* — Jesse Pullias
(74) *Attorney, Agent, or Firm* — Steve Crocker; Tom Wong; Micky Minhas

(57) ABSTRACT

New word detection and domain dictionary recommendation are provided. When text content is received according to a given language, for example, Chinese language, words are extracted from the content by analyzing the content according to a variety of rules. The words then are ranked for inclusion into one or more lexicons or domain dictionaries for future use for such functionalities as text input methods, spellchecking, grammar checking, auto entry completion, definition, and the like. In addition, when a user is entering or editing text according to one or more prescribed domain dictionaries, a determination may be made as to whether more helpful domain dictionaries may be available. When entered words have a high degree of association with a given domain dictionary, that domain dictionary may be recommended to the user to increase the accuracy of the user's input of additional text and editing of existing text.

24 Claims, 10 Drawing Sheets

(56) References Cited

U.S. PATENT DOCUMENTS

| | | | |
|---|---|---|---|
| 6,363,377 B1 | 3/2002 | Kravets et al. | |
| 6,370,527 B1 | 4/2002 | Singhal | |
| 6,377,945 B1 | 4/2002 | Risvik | |
| 6,510,406 B1 | 1/2003 | Marchisio | |
| 6,675,159 B1 | 1/2004 | Lin et al. | |
| 6,697,818 B2 | 2/2004 | Li et al. | |
| 6,711,577 B1* | 3/2004 | Wong et al. | 707/694 |
| 6,804,677 B2 | 10/2004 | Shadmon et al. | |
| 7,024,624 B2* | 4/2006 | Hintz | 715/205 |
| 7,080,068 B2 | 7/2006 | Leitermann | |
| 7,149,746 B2 | 12/2006 | Fagin et al. | |
| 7,254,774 B2 | 8/2007 | Cucerzan et al. | |
| 7,293,003 B2 | 11/2007 | Horton | |
| 7,296,011 B2 | 11/2007 | Chaudhuri et al. | |
| 7,330,811 B2 | 2/2008 | Turcato et al. | |
| 7,440,941 B1 | 10/2008 | Borkovsky et al. | |
| 7,483,829 B2 | 1/2009 | Murakami et al. | |
| 7,526,425 B2 | 4/2009 | Marchisio et al. | |
| 7,552,112 B2 | 6/2009 | Jhala et al. | |
| 7,617,202 B2 | 11/2009 | Brill et al. | |
| 7,627,548 B2 | 12/2009 | Riley et al. | |
| 7,634,462 B2 | 12/2009 | Weyand et al. | |
| 7,636,714 B1 | 12/2009 | Lamping et al. | |
| 7,707,047 B2 | 4/2010 | Hasan et al. | |
| 7,778,817 B1 | 8/2010 | Liu et al. | |
| 7,860,853 B2 | 12/2010 | Ren et al. | |
| 7,877,343 B2 | 1/2011 | Cafarella | |
| 7,890,521 B1 | 2/2011 | Grushetskyy et al. | |
| 7,890,526 B1 | 2/2011 | Brewer et al. | |
| 7,958,489 B2 | 6/2011 | Meijer et al. | |
| 8,239,751 B1 | 8/2012 | Rochelle et al. | |
| 8,332,333 B2 | 12/2012 | Agarwal | |
| 8,417,713 B1 | 4/2013 | Blair-Goldensohn et al. | |
| 8,429,099 B1 | 4/2013 | Perkowitz et al. | |
| 8,533,203 B2 | 9/2013 | Chaudhuri et al. | |
| 8,577,907 B1 | 11/2013 | Singhal et al. | |
| 8,745,019 B2 | 6/2014 | Cheng et al. | |
| 2001/0042080 A1 | 11/2001 | Ross | |
| 2002/0103793 A1 | 8/2002 | Koller et al. | |
| 2002/0169755 A1 | 11/2002 | Framroze et al. | |
| 2003/0004716 A1 | 1/2003 | Haigh et al. | |
| 2003/0033288 A1 | 2/2003 | Shanahan et al. | |
| 2003/0120651 A1 | 6/2003 | Bernstein et al. | |
| 2003/0195877 A1 | 10/2003 | Ford et al. | |
| 2004/0254920 A1 | 12/2004 | Brill et al. | |
| 2005/0021324 A1* | 1/2005 | Brants et al. | 704/9 |
| 2005/0060312 A1 | 3/2005 | Curtiss et al. | |
| 2005/0060337 A1 | 3/2005 | Chou et al. | |
| 2005/0060643 A1 | 3/2005 | Glass et al. | |
| 2005/0080613 A1 | 4/2005 | Colledge et al. | |
| 2005/0086592 A1 | 4/2005 | Polanyi et al. | |
| 2005/0114322 A1 | 5/2005 | Melman | |
| 2005/0149494 A1 | 7/2005 | Lindh et al. | |
| 2005/0216443 A1 | 9/2005 | Morton et al. | |
| 2005/0216444 A1 | 9/2005 | Ritter et al. | |
| 2006/0026128 A1 | 2/2006 | Bier | |
| 2006/0031207 A1 | 2/2006 | Bjarnestam et al. | |
| 2006/0069589 A1 | 3/2006 | Nigam et al. | |
| 2006/0089927 A1 | 4/2006 | Bandyopadhyay et al. | |
| 2006/0136405 A1 | 6/2006 | Ducatel et al. | |
| 2006/0195421 A1 | 8/2006 | Kilroy | |
| 2006/0206306 A1 | 9/2006 | Cao et al. | |
| 2006/0218136 A1 | 9/2006 | Surakka et al. | |
| 2006/0253427 A1 | 11/2006 | Wu et al. | |
| 2007/0011154 A1 | 1/2007 | Musgrove et al. | |
| 2007/0011183 A1 | 1/2007 | Langseth et al. | |
| 2007/0038663 A1 | 2/2007 | Colando | |
| 2007/0043723 A1 | 2/2007 | Bitan et al. | |
| 2007/0073745 A1 | 3/2007 | Scott et al. | |
| 2007/0094285 A1 | 4/2007 | Agichtein et al. | |
| 2007/0100823 A1 | 5/2007 | Inmon | |
| 2007/0192085 A1 | 8/2007 | Roulland et al. | |
| 2007/0203929 A1 | 8/2007 | Bolivar | |
| 2007/0233656 A1 | 10/2007 | Bunescu et al. | |
| 2007/0239742 A1 | 10/2007 | Saha et al. | |
| 2008/0016040 A1 | 1/2008 | Jones et al. | |
| 2008/0021898 A1 | 1/2008 | Hoglund | |
| 2008/0077570 A1 | 3/2008 | Tang et al. | |
| 2008/0087725 A1 | 4/2008 | Liu | |
| 2008/0091660 A1 | 4/2008 | Jang et al. | |
| 2008/0097941 A1 | 4/2008 | Agarwal | |
| 2008/0109416 A1 | 5/2008 | Williams | |
| 2008/0147618 A1 | 6/2008 | Bauche | |
| 2008/0154873 A1 | 6/2008 | Redlich et al. | |
| 2008/0195601 A1 | 8/2008 | Ntoulas et al. | |
| 2008/0275837 A1 | 11/2008 | Lambov | |
| 2009/0044095 A1 | 2/2009 | Berger et al. | |
| 2009/0144609 A1 | 6/2009 | Liang et al. | |
| 2009/0222434 A1 | 9/2009 | Fothergill | |
| 2009/0282012 A1 | 11/2009 | Konig et al. | |
| 2009/0319500 A1 | 12/2009 | Agrawal et al. | |
| 2009/0327223 A1 | 12/2009 | Chakrabarti et al. | |
| 2010/0004925 A1 | 1/2010 | Ah-Pine et al. | |
| 2010/0082657 A1 | 4/2010 | Paparizos et al. | |
| 2010/0121702 A1 | 5/2010 | Steelberg et al. | |
| 2010/0250598 A1 | 9/2010 | Brauer et al. | |
| 2010/0293179 A1 | 11/2010 | Chaudhuri et al. | |
| 2010/0313258 A1 | 12/2010 | Chaudhuri et al. | |
| 2011/0029513 A1 | 2/2011 | Morris | |
| 2011/0071965 A1 | 3/2011 | Long et al. | |
| 2011/0106807 A1 | 5/2011 | Srihari et al. | |
| 2011/0125776 A1 | 5/2011 | Roshen et al. | |
| 2011/0213796 A1 | 9/2011 | Kiyota et al. | |
| 2011/0282856 A1 | 11/2011 | Ganti et al. | |
| 2011/0302179 A1 | 12/2011 | Agrawal | |
| 2011/0307485 A1 | 12/2011 | Udupa et al. | |
| 2012/0011115 A1 | 1/2012 | Madhavan et al. | |
| 2012/0117078 A1 | 5/2012 | Morton et al. | |
| 2012/0150838 A1 | 6/2012 | Yin et al. | |
| 2012/0191642 A1 | 7/2012 | George | |
| 2012/0259890 A1 | 10/2012 | Denesuk et al. | |
| 2013/0166573 A1 | 6/2013 | Vaitheeswaran et al. | |
| 2013/0232129 A1 | 9/2013 | Cheng et al. | |
| 2013/0238621 A1 | 9/2013 | Ganjam et al. | |
| 2013/0346421 A1 | 12/2013 | Wang et al. | |
| 2013/0346464 A1 | 12/2013 | Cheng et al. | |

OTHER PUBLICATIONS

International Search Report and Written Opinion for PCT/US2013/055500 mailed Feb. 13, 2014.

U.S. Appl. No. 12/235,635, filed Sep. 23, 2008 entitled "Generating Synonyms Based on Query Log Data".

U.S. Appl. No. 12/478,120, filed Jun. 4, 2009 entitled "Identifying Synonyms of Entities Using a Document Collection".

U.S. Appl. No. 12/779,964, filed May 14, 2010 entitled "Identifying Entity Synonyms".

U.S. Appl. No. 13/413,179, filed Mar. 6, 2012 entitled "Entity Augmentation Service from Latent Relational Data".

U.S. Appl. No. 13/487,260, filed Jun. 4, 2012 entitled "Robust Discovery of Entity Synonyms Using Query Logs".

U.S. Appl. No. 13/527,601, filed Jun. 20, 2012 entitled "Data Services for Enterprises Leveraging Search System Data Assets".

U.S. Appl. No. 13/531,493, filed Jun. 22, 2012 entitled "Targeted Disambiguation of Named Entities".

Agrawal, et al., "Exploiting web search engines to search structured databases," retrieved at <<http://acm.org>>, Proceedings of the 18th International Conference on World Wide Web, Apr. 2009, pp. 501-510.

Agrawal, "Mining Association Rules Between Sets of Items in Large Databases," retrieved at <<http://rakesh.agrawal-family.com/papers/sigmod93assoc.pdf>>, Proceedings of the 1993 ACM SIGMOD International Conference on Management of Data, May 1993, 10 pages.

Agrawal, et al., "Scalable Ad-hoc Entity Extraction from Text Collections," retrieved at <<http://www.acm.org>>, Proceedings of the VLDB Endowment VLDB Endowment, vol. 1, Issue 1, Aug. 2008, pp. 945-957.

Aho, et al., "Efficient String Matching: An Aid to Bibliographic Search," retrieved at <<http://www.win.lue.nl/~watson/2R080/

(56) References Cited

OTHER PUBLICATIONS opdrachl/p333-aho-corasick.pdf>>, Communications of the ACM CACM, vol. 18, Issue 6, Jun. 1975, pp. 333-340.
Ananthanarayanan et al., "Rule Based Synonyms for Entity Extraction from Noisy Text", Proceedings of the Second Workshop on Analytics for Noisy Unstructured Text Data, pp. 31-38, 2008.
Appelt et al., "Introduction to Information Extraction Technology", Proceedings of the International Joint Conference on Artificial Intelligence Tutorial, 1999.
Arasu, et al., "Efficient Exact Set-Similarity Joins," retrieved at <<http://www.vldb.org/conf/2006/p918-arasu.pdf>>, Proceedings of the 32nd International Conference on Very Large Data Bases, Sep. 2006, pp. 918-929.
Arasu et al.,"Learning String Transformations from Examples", Proceedings of the Publication of Very Large Database Endowment, pp. 2(1):514-525, 2009.
Arasu, et al., "PageRank Computation and the Structure of the Web: Experiments and Algorithms," retrieved at <<http://www2002.org/CDROM/poster/173.pdf >22 , Proceedings of the Eleventh International World Wide Web Conference, 2002, 5 pages.
Arasu et al., "Transformation-Based Framework for Record Matching" Proceedings of the 24th IEEE International Conference on Data Engineering, pp. 40-49, 2008.
Artiles, et al., "WePS-3 Evaluation Campaign: Overview of the Web People Search Clustering and Attribute Extraction Tasks," retrieved at <<http://citeseerx.isl.psu.edu/viewdoc/download?doi=10.1.1.174.3094&rep=rep1&type=pdf>>, Proceedings of CLEF, 2010, 15 pages.
Baeza-Yates, et al., "Extracting Semantic Relations from Query Logs," retrieved at <<http://acm.org>>, Proceedings of the 13th ACM SIGKDD International Conference on Knowledge Discovery and Data Mining, Aug. 12-15, 2007, pp. 76-85 (cited in Aug. 27, 2012 OA, MS# 328870.01).
Bahmani, et al., "Fast Personalized Pagerank on Mapreduce", In SIGMOD, Jun. 12-16, 2011, Athens, Greece, 12 pages.
Banko et al., "Open Information Extraction from the Web", Commun. ACMm 51, 12 (Dec. 2008), 68-74.
Baroni, et al., "Using cooccurrence statistics and the web to discover synonyms in a technical language," retrieved at <<http://clic.cimec.unitn.il/marco/publications/lrec2004/syn_lrec_2004.pdf>>, Proceedings of the LREC 2004, 2004, 4 pages.
Berlin, et al., "TupleRank: Ranking Discovered Content in Virtual Databases", In Proceedings of 6th International Conference on Next Generation Information Technologies and Systems, Jul. 4-6, 2006, 15 pages.
Bernstein, et al., Generic Schema Matching, Ten Years Later. In VLDB Endowment, vol. 4, No. 11, 2011, 7 pages.
Bhattacharya, et al., "Collective Entity Resolution in Relational Data," retrieved at http://linqs.cs.umd.edu/basilic/web/Publications/2007 /bhattacharya:tkdd07 /bhattacharya-tkdd.pdf>>, ACM Transactions on Knowledge Discovery from Data, vol. 1, No. 1, 2007, 35 pages.
Bohn, Christian, "Extracting Named Entities and Synonyms from Wikipedia for use in News Search," retrieved at <<http://daim.idi.ntnu.no/masteroppgaver/IME/ID1/2008/4290/masteroppgave.pdf>>, Master of Science in Computer Science, Norwegian University of Science and Technology, Department of Computer and Information Science, Jun. 2008, 95 pages.
Booth et al., "Query Sentences as Semantic (Sub) Networks", 2009 IEEE International Conference on Semantic Computing, 6 pages. (cited in Apr. 29, 2015 OA, MS# 328870.01).
Brin, et al., "The Anatomy of a Large-Scale Hypertextual Web Search Engine," retrieved at <<http://www.cs.panam.edu/-creilly/courses/CSC16175-F11 /papers/Brin-1998.pdf>>, Proceedings of the Seventh International Conference on World Wide Web 7, 1998, 20 pages.
Bunescu, et al., "Using Encyclopedic Knowledge for Named Entity Disambiguation," retrieved at <<http://www.cs.utexas.edu/-ml/papers/encyc-eac1-06.pdf>>, Proceeding of the 11th Conference of the European Chapter of the Association of Computational Linguistics, 2006, 8 pages.
Cafarella, et al., Data Integration for the Relational Web. VLDB, Aug. 24-28, 2009, Lyon, France, 12 pages.
Cafarella, et al., "Uncovering the Relational Web", In WebDB, Jun. 13, 2008, Vancouver, Canada, 6 pages.
Cafarella, et al., Webtables: Exploring the Power of Tables on the Web, PVLDB, 2008, 12 pages.
Chaiken et al., "Scope: Easy and Efficient Parallel Processing of Massive Data Sets", Proceedings of Very Large Database Endowment, pp. 1(2):1265-1276, 2008.
Chakaravarthy, et al., "Efficiently Linking Text Documents with Relevant Structured Information," retrieved at <<http://www.vldb.org/conf/2006/p667-chakaravarthy.pdf>>, VLDB '06, Proceedings of the 32nd International Conference on Very Large Data Bases, 2006, pp. 667-678.
Chakrabarti, et al., "An Efficient Filter for Approximate Membership Checking," retrieved at <<http://acm.org>>, Proceedings of the 2008 ACM SIGMOD International Conference on Management of Data, Jun. 2008, pp. 805-817.
Chang, et al., "Structured Databases on the Web: Observations and Implications," Acm Sigmod Record archive, vol. 33, Issue 3, 2004, accessible at <<http://eagle.cs.uiuc.edu/pubs/2004/dwsurvey-sigmodrecord-chlpzaug04.pdf>>, 10 pages.
Chaudhuri, et al., "A Primitive Operator for Similarity Joins in Data Cleaning," retrieved at <<http://ieeexploreleee.org/slamp/slamp.jsp?arnumber=1617373&isnumber=33902>>, Proceedings of the 22nd International Conference on Data Engineering (ICDE 2006), 2006, 12 pages.
Chaudhuri, et al., "Exploiting Web Search to Generate Synonyms for Entities," retrieved at <<http://www2009.org/proceedings/pdf/p151.pdf>>, Proceedings of the 18th International Conference on World Wide Web, Apr. 2009, pp. 151-160.
Chaudhuri, et al., "Mining Document Collections to Facilitate Accurate Approximate Entity Matching," retrieved at <<http://www.vldb.org/pvldb/2/vldb09-315.pdf>>, Proceedings of the VLDB Endowment, vol. 2, No. 1, Aug. 2009, 12 pages.
Chaudhuri, et al., "Mining the Web to Facilitate Fast and Accurate Approximate Match", Proceedings of WWW2009, Apr. 20-24, 2009, pp. 1-10.
Chaudhuri, et al., "Robust and Efficient Fuzzy Match for Online Data Cleaning," retrieved at <<http://research.microsofl.com/pubs/75996/bm_sigmod03.pdf, SIGMOND 2003, 2003, pp. 313-324.
Chen, et al., "A Query Substitution-Search Result Refinement Approach for Long Query Web Searches," retrieved at <<http://ieeexploreleee.org/stamp/stamp.jsp?tp=&arnumber=5286069>>,2009 IEEE/WIC/ACM International Conferences on Web Intelligence and Intelligent Agent Technologies, Sep. 15, 2009, pp. 245-251.
Cheng, et al., "EntityRank: Searching Entities Directly and Holistically," retrieved at http://www-forward.cs.uiuc.edupubs/2007/entityrank-vldb07-cyc-jul07.pdf>>, Proceedings of the 33rd International Conference on Very Large Data Bases, Sep. 2007, 12 pages (cited in Apr. 2, 2013 OA, MS# 334531.01).
Cheng, et al., "Entity Synonyms for Structured Web Search," retrieved at <<http://ieeexplore.ieee.org/stamp/stamp.jsp?tp=&arnumber=5963679>>, IEEE Transactions on Knowledge and Data Engineering, No. 99, Jul. 2011, pp. 1-15.
Cheng, et al., "Fuzzy Matching of Web Queries to Structured Data"; 2010 IEEE 26th International Conference on Data Engineering (ICDE), Mar. 2010, pp. 713-716.
Chirita, et al., "PTAG: Large Scale Automatic Generation of Personalized Annotation TAGs for the Web," retrieved at <<http://acm.org>>, Proceedings of the 16th International Conference on World Wide Web, May 2007, pp. 845-854.
Chklovski, et al., "Verbocean: Mining the Web for Fine-Grained Semantic Verb Relations," Proceedings of EMNLP 2004, 2004, accessible at <<http://acl.ldc.upenn.edu/acl2004/emnlp/pdf/Chklovski.pdf>>, 8 pages.
Cohen, et al., "Exploiting Dictionaries in Named Entity Extraction: Combining Semi-Markov Extraction Processes and Data Integration Methods," retrieved on at <<http://www.cs.cmu.edu/-wcohen/postscrip1/kdd-04-csmm.pdf>>, Proceedings of the Tenth ACM SIGKDD International Conference on Knowledge Discovery and Data mining, Aug. 2004, 10 pages.

(56) References Cited

OTHER PUBLICATIONS

Cohen, et al., "Learning to Match and Cluster Large High-Dimensional Data Sets for Data Integration", in Proceedings of the Eighth ACM SIFKDD International Conference on Knowledge Discovery and Data Mining, Jul. 23-26, 2002, 6 pages.
Cohen, et al., "XSEarch: A Semantic Search Engine for XML," Proceedings of the 29th VLDB Conference, Berlin, Germany, 2003, accessible at <<http://www.vldb.org/conf/2003/papers/S03P02.pdf>>, 12 pages.
Craswell, et al., "Random Walks on the Click Graph," Proceedings of the 30th Annual International ACM SIGIR Conference on Research and Development in Information Retrieval, 2007, accessible at <<http://research.microsoft.com/users/nickcepubs/craswell_sigir07.pdf>>, 8 pages.
Cucerzan, Silviu, "Large-Scale Named Entity Disambiguation Based on Wikipedia Data," retrieved at <<http://acl.ldc.upenn.edu/D/D07/D07-1074.pdf>>, Proceedings of the 2007 Joint Conference on Empirical Methods in Natural Language Processing and Computational Natural Language, 2007, pp. 708-716.
Dagan et al., "Contextual Word Similarity and Estimation from Sparse Data", Computer Speech and Language, 9:123-152,1993.
Dean et al., "MapReduce: Simplified Data Processing on Large Clusters", Communications of the ACM—50th Anniversary Edition, vol. 51 Issue 1, pp. 107-113, Jan. 2008.
Dill, et al., "SemTag and Seeker: Bootstrapping the Semantic Web Via Automated Semantic Annotation," retrieved at <<http://what.csc.villanova.edu/-cassel/901OSemanticWeb/SemTag%20and%20Seeker%20Bootstrapping%20the%20semantic%20web%20via%20automated%20semantic%20annotation.pdf>>, Proceedings of the 12th International Conference on World Wide Web, 2003, 9 pages.
"Distributional hypothesis," retrieved at <<http://en.wikipedia.org/wiki/Distribulional_hypothesis>>, retrieved on Mar. 1, 2011, Wikipedia online encyclopedia excerpt, 2 pages.
Doan, et al., "Reconciling Schemas of Disparate Data Sources: A Machine-Learning Approach", In ACM SIGMOD, May 21-24, 2001, 12 pages.
Dong, et al., "Reference Reconciliation in Complex Information Spaces," retrieved at <<http://acm.org>>, Proceedings of the 2005 ACM SIGMOD International Conference on Management of Data, 2005, pp. 85-96.
Elsayed, et al., "Pairwise Document Similarity in Large Collections with Mapreduce", In ACL, Jun. 2008, 4 pages.
"Enterprise software," retrieved at <<http://en.wikipedia.org/wiki/Enterprise_software, retrieved on Jun. 19, 2012, Wikipedia article, 3 pages.
Feldman et al., "Self-supervised Relation Extraction from the Web," F. Esposito et al. (Eds.): ISMIS 2006, LNAI 4203, pp. 755-764, 2006 (cited in Apr. 2, 2013 OA, MS# 334531.01).
"Foundations of Statistical Natural Language Processing," retrieved at http://nlp.stanford.edu/fsnlp/>>, retrieved on Jul. 4, 2012, companion website to the book: Foundations of Statistical Natural Language Processing, Manning, et al., MIT Press, Jun. 18, 1999, 2 pages.
Fuxman, et al., "Using the Wisdom of the Crowds for Keyword Generation," Proceeding of the 17th International Conference on World Wide Web, 2008, accessible at http://delivery.acm.org/10.1145/1370000/1367506/p61fuxman.pdf?key1=1367506&key2=7612479121&coll=&dl=ACM&CFID=592564&CFTOKEN=87519440, pp. 61-70.
Gale, et al., "One Sense Per Discourse," retrieved at <<http://citeseerx.isl.psu.edu/viewdoc/download;jsessionid=8EA215CD078134CA243A22FF6DDA2871?doi=10.1.1.178.2723&rep=rep1 &type=pdf>>, Proceedings of the Workshop on Speech and Natural Language, 1992, pp. 233-237.
Ganti, et al., "Entity Categorization Over Large Document Collections", retrieved on Mar. 9, 2009 at <<KDD 2008, Aug. 24-27, 2008, Las Vegas, Nevada, pp. 274-282.
Gentile, et al., "Graph-based Semantic Relatedness for Named Entity Disambiguation," retrieved at <<http://staffwww.dcs.shef.ac.uk/people/J.lria/iria_s3t09.pdf>>, Proceedings of the 1st International Conference on Software, Services and Semantic Technologies (S3T), Oct. 2009, 8 pages.
Ghani, et al., "Text Mining for Product Attribute Extraction", SIGKDD Explorations, vol. 8, Issue 1, Jun. 2006, 8 pages.
Gligorov, et al., "Using Google Distance to Weight Approximate Ontology Matches", retrieved on Mar. 5, 2009 at http://www.cs.vu.nl/-frankh/postscripl/BNAIC07-WWW07.pdf>>, Proc. Of World Wide Web Con!., 2007, 2 pages.
Gooi, et al., "Cross-Document Coreference on a Large Scale Corpus," retrieved at <<http://acl.ldc.upenn.edu/hlt-naacl2004/main/pdf/177_Paper.pd!, In HLT-NAACL, 2004, 8 pages.
Graupmann, "Concept-Based Search on Semi-Structured Data Exploiting Mined Semantic Relations," EDBT 2004 Workshops, LNCS 3268, Eds. W. Lindner et al., Springer-Verlag, Berlin Heidelberg, 2004, accessible at <<http://www.springerlink.com/content/p7fw8dk70v2x8w4a/fulltext.pdf>>, pp. 34-43.
Guo, et al., "Named Entity Recognition in Query," retrieved at <<http://acm.org>>, Proceedings of the 32nd International ACM SIGIR Conference on Research and Development in Information Retrieval, Jul. 2009, pp. 267-274.
Gupta, et al., "Answering Table Augmentation Queries from Unstructured Lists on the Web", Proc. Vldb Endowment, Aug. 24-28, 2009, Lyon France, 12 pages.
Han, et al., "Collective Entity Linking in Web Text: A Graph-Based Method," retrieved at <<http://www.nlpr.ia.ac.cn/2011papers/gjhy/gh133.pdf, Proceedings of the 34th International ACM SIGIR Conference on Research and Development in Information Retrieval, Jul. 2011, pp. 765-774.
Han, et al., "Data Mining: Concepts and Techniques", retrieved on Mar. 9, 2009 at <<http://www.ir.iil.edu/- dagr/DalaMiningCourse/Spring2001/BookNotes/41ang.pdf>>, Intelligent Database Systems Research Lab, School of Computing Science, Simon Fraser University, Canada, 5 pages.
Han et al., "Mining Frequent Patterns without Candidate Generation" Proceedings of the 2000 ACM SIGMOD international Conference on Management of Data, pp. 1-12, 2000.
Han, et al., "Named Entity Disambiguation by Leveraging Wikipedia Semantic Knowledge," retrieved at <<http://avss2012.org/cip/ZhaoJunPublications/paper/CIKM2009.NED.pdf>>, Proceedings of the 18th ACM Conference on Information and Knowledge Management, 2009, 10 pages.
Haveldatala, et al., "Topic-Sensitive Pagerank", In WWW 2002, May 7-11, 2002, Honolulu, Hawaii, 10 pages.
He, et al., "Seisa: Set Expansion by Iterative Similarity Aggregation", In WWW, Mar. 28-Apr. 1, 2011, Hyderabad, India, 10 pages. (cited in Apr. 2, 2013 OA, MS# 334531.01).
He, et al., "Statistical Schema Matching Across Web Query Interfaces", In SIGMOD 2003, Jun. 9-12, 2003, San Diego, CA, 12 pages.
Hipp, et al., "Algorithms for Association Rule Mining—A General Survey and Comparison", ACM SIGKDD Explorations Newletter vol. 2 Issue 1, Jun. 2000, pp. 58-64.
Hoffart, et al., "Robust Disambiguation of Named Entities in Text," retrieved at <<http://aclweb.org/anthology-new/D/D11/D11-1072.pdf>>, Proceedings of the 2011 Conference on Empirical Methods in Natural Language Processing, Jul. 2011, pp. 782-792.
Hu, "ApproxSeek: Web Document Search Using Approximate Matching", retrieved on Mar. 5, 2009 at <<http://citeseerx.ist.psu.edu/viewdoc/download;jsessionid=F776964FOOB448D5445A84C3528FOE83?doi=10.1.1.44.8602&rep=repl &lype=pdf, The Fifth International Conference on Computer Science and Informatics, Sep. 1999, pp. 1-5.
Isard, et al., "Dryad: Distributed Data-Parallel Programs from Sequential Building Blocks," retrieved at <<http://research.microsoft.com/pubs/63785/eurosys07.pdf>>, EuroSys 2007, 2007, 14 pages.
Jain, et al., "Domain-Independent Entity Extraction from Web Search Query Logs," retrieved at <<http://www.marcopennacchiotti.com/pro/publications/WWW_2011_2.pdf, Proceedings of the 2oth International Conference Companion on World Wide Web, Mar. 28, 2011, pp. 63-64.

(56) References Cited

OTHER PUBLICATIONS

Jones, et al., "Generating Query Substitutions," retrieved at <<http://acm.org>>, Proceedings of the 15th International Conference on World Wide Web, 2006, pp. 387-396 (cited in Nov. 3, 2011 OA, MS# 326644.01).

Kasliwal, et al., "Text Mining in Biomedical Literature", retrieved on Mar. 9, 2009 at <<http://www.cse.iilb.ac.in/-sourabh/seminar/final/seminar_report>>, Department of Computer Science and Engineering, Indian Institute of Technology, Bombay, India, 27 pages.

Kim, et al., "A comparison of collocation-based similarity measures in query expansion"; Information Processing and Management No. 35, 1999, pp. 19-30.

Klapaftis, et al., "Google & WordNet based Word Sense Disambiguation", Workshop on Learning & Extending Ontologies Bonn Germany, Aug. 2005, 5 pages (cited in Jun. 6, 2013 NOA, MS #326644.01).

Kowalski, et al., "Information Storage and Retrieval Systems: Theory and Implementation", Kluwer Academic Publishers, 2002, 36 pages (cited in Jun. 6, 2013 NOA, MS# 326644.01).

Koudas, et al., "Record Linkage: Similarity Measures and Algorithms", retrieved on Mar. 9, 2009 at <<http://queens.db.toronto.edu/-koudas/docs/aj.pdf>>, 130 pages.

Kulkarni, et al., "Collective Annotation of Wikipedia Entities in Web Text," retrieved at <<http://www.cc.gatech.edu/-zha/CSE8801/query-annotation/p457-kulkarni.pdf>>, Proceedings of the 15th ACM SIGKDD International Conference on Knowledge Discovery and Data mining, 2009, pp. 457-465.

Lafferty et al., "Conditional Random Fields: Probalistic Models for Segmenting and Labeling Sequence Data", Proceedings of the Eighteenth International Conference on Machine Learning, pp. 282-289, 2001.

Limaye, et al., "Annotating and Searching Web Tables Using Entities, Types and Relationships", VLDB Endowment, vol. 3, No. 1, 2010, 10 pages.

Lin, Dekang, "Automatic Retrieval and Clustering of Similar Words", Proceedings of the 17th International Conference on Computational Linguistics, vol. 2, pp. 768-774, 1998.

Loser et al., Augementing Tables by Self-Supervised Web Search, M. Castellanos, U. Dayal, and V. Marki (Eds.): BIRTE 2010, LNBIP 84, pp. 84-99, 2011.

Madhavan, et al., Corpus-based Schema Matching, 21st International Conference on Data Engineering, Apr. 5-8, 2005, 12 pages.

Madhavan, et al., "Generic Schema Matching with Cupid", 27th VLDB Conference, 2001, Roma, Italy, 10 pages.

Malekian, et al., "Optimizing Query Rewrites for Keyword-Based Advertising," ACM Conference on Electronic Commerce (EC), Chicago, Illinois, Jul. 8-12, 2008, accessible at <<http://delivery.acm.org/10.1145/1390000/1386793/ p 10-malekian.pdf?key1=1386793&key2=885247 9121 &coll=ACM&dl=ACM&CFID=593354&CFTOKEN=82835948>>, pp. 10-19.

Mann, et al., "Unsupervised Personal Name Disambiguation," retrieved at <<http://citeseerx.isl.psu.edu/viewdoc/download?doi=10.1.1.10.7097&rep=repl&type=pdf>>, Proceedings of the Seventh Conference on Natural Language Learning at HL T-NAACL 2003, vol. 4, 2003, 8 pages.

Manning et al., Foundations of Statistical Natural Language Processing, The MIT Press, 1999.

Mei, et al., "Query suggestion using hilling lime," retrieved at <<http://ACM.org>>, Proceedings of the 17th ACM Conference on Information and Knowledge Management, Oct. 2008, pp. 469-477.

Michelson et al., "Mining Heterogeneous Transformations for Record Linkage", llWeb, pp. 68-73, AAAI Press, 2007.

"Microsoft Research Techfest 2012: Projects"; retrieved at http:i/researdunicrosoft.corn/en-us/events/techfest2012/projects.aspx; retrieved on Apr. 10, 2012; Microsoft Corporation; Redmond, WA; 7 paqes.

Mihalcea, Rada, "Unsupervised Large-Vocabulary Word Sense Disambiguation with Graph-based Algorithms for Sequence Data Labeling," retrieved at <<http://www.aclweb.org/anthology-new/H/H05/H05-1052.pdf>>, Proceedings of Human Language Technology Conference and Conference on Empirical Methods in Natural Language Processing (HLT/EMNLP), Oct. 2005, pp. 411-418.

Mihalcea, et al., "Wikify! Linking Documents to Encyclopedic Knowledge," retrieved at <<http://www.cse.unl.edu/-rada/papers/mihalcea.cikm07.pdf>>, Proceedings of the Sixteenth ACM Conference on Conference on Information and Knowledge Management, 2007, 9 pages.

Miller, George a., "Wordnet: A Lexical Database for English," Communications of the ACM, vol. 38, No. 11, Nov. 1995, accessible at <<http://delivery.acm.org/10.1145/220000/219748/p39-miller.pdf?key1 =219748&key2=0502389121&coll=GUIDE&dl=GUIDE&CFID=604516&CFTOKEN=66566361, pp. 39-41.

Milne, et al., "Learning to Link with Wikipedia," retrieved at <<http://citeseerx.isl.psu.edu/viewdoc/download?doi=10.1.1.148.3617&rep=rep1&type=pdf>>, Proceedings of the 17th ACM Conference on Information and Knowledge Management, 2008, 10 pages.

Minjuan, et al., "Pseudo-Relevance Feedback Driven for XML Query Expansion," retrieved at http://www.aicil.org/jcil/ppl/JCIT0509_15.pdf>>, Journal of Convergence Information Technology, vol. 5, No. 9, Nov. 2010, pp. 146-156.

Nadeau, et al., "Unsupervised Named-Entity Recognition: Generating Gazetteers and Resolving Ambiguity," retrieved at <<http://cogprints.org/5025/1/NRC-48727.pdf>>, Proceedings of 19th Conference of the Canadian Society for Computational Studies of Intelligence, Jun. 7, 2006, pp. 266-277.

Navarro, Gonzalo, "A Guided Tour to Approximate String Matching," retrieved at <<http://ACM.org>>, ACM Computing Surveys, vol. 33, Issue 1, Mar. 2001, pp. 31-88.

Page, et al., The Pagerank Citation Ranking: Bringing Order to the Web. Technical Report, Stanford InfoLab, 1998, 17 pages.

"PageRank," retrieved at <<http://en.wikipedia.org/wiki/PageRank>>, Wikipedia article, retrieved on Sep. 11, 2008; 5 pgs.

Pantel, et al., "Web-Scale Distributional Similarity and Entity Set Expansion," retrieved at <<http://www.aclweb.org/anthology/D/D09/D09-1098.pdf>>, Proceedings of the 2009 Conference on Empirical Methods in Natural Language Processing, Aug. 2009, pp. 938-947.

Pasca, Marius, "Weakly-Supervised Discovery of Named Entities Using Web Search Queries," retrieved at <<http://www.acm.org>>, Proceedings of the Sixteenth ACM Conference on Conference on Information and Knowledge Management, Nov. 2007, pp. 683-690.

Pasquier, et al., "Efficient Mining of Association Rules Using Closed ltemset Lattices", Elsevier Science Lid., 1999, vol. 24, No. 1, pp. 25-46.

Peters, et al., "Folksonomy and Information Retrieval," retrieved at <<http://www.all.phil-fak.uni-duesseldorf.de/infowiss/admin/public_dateien/files/1/1194344432asist_am07.pdf>>, Proceedings of the 70th ASIS&T Annual Meeting, vol. 44, 2007, 33 pages.

Rahm, et al., "A Survey of Approaches to Automatic Schema Matching", The VLDB Journal, 2001, 24 pages.

Rodriguez, et al., "Determining Semantic Similarity Among Entity Classes From Different Ontologies", In IEEE Transactions on Knowledge and Data Engineering, vol. 15, Issue 2, Mar. 1, 2003, pp. 442-456.

Sarawagi, Sunita, "Models and Indices for Integrating Unstructured Data with a Relational Database", In Proceedings of the Workshop on Knowledge Discovery in Inductive Databases, Sep. 20, 2004, 10 pages.

Sarkas, et al., "Structured Annotations of Web Queries," retrieved at <<http://acm.org>>, Proceedings of the 2010 International Conference on Management of Data, Jun. 2010, pp. 771-782.

Sarmento, et al., "An Approach to Web-scale Named-Entity Disambiguation," accessible at <<http://sigarra.up.pt/feup/publs_pesquisa.show_publ_file?pct_gdoc_id=68610.>>, Proceedings of the 6th International Conference on Machine Learning and Data Mining in Pattern Recognition, 2009, 15 pages.

Schallehn, et al., "Efficient Similarity-based Operations for Data Integration", In Journal of Data & Knowledge Engineering, vol. 48, Issue 3, Aug. 12, 2003, 27 pages.

Schenkel, et al., "Efficient Top-k Querying over Social-Tagging Networks," retrieved at <<http://acm.org>>, Proceedings of the 31st

(56) References Cited

OTHER PUBLICATIONS

Annual International ACM SIGIR Conference on Research and Development in Information Retrieval, Jul. 2008, 8 pages.
Smeaton et al., "Experiments on Incorporating Syntactic Processing of User Queries into a Document Retrieval Strategy", Proceedings of the 11th Annual International ACM SIGIR Conference on Research and Development of Information Retrieval (SIGR'88), Jun. 1988, pp. 31-51.
Strube, et al., "Wikirelate! Computing Semantic Relatedness Using Wikipedia," AAAI Press, 2006, accessible at <<http://www.dit.unitn.it/-p2p/RelatedWork/Matching/aaai06.pdf>>, 6 pages.
Tsoukalas, et al., "PLEDS: A Personalized Entity Detection System Based on Web Log Mining Techniques," retrieved at <<http://www2.fas.sfu.ca/pub/cs/techreports/2008/CMPT2008-06.pdf>>, WAIM, Proceedings of the Ninth International Conference on Web-Age Information Management, Jul. 2008, pp. 1-23.
Turney, Peter D., "Mining the Web for Synonyms: PM1-IR versus LSA on TOEFL," Lecture Notes in Computer Science, 2167, 2001, accessible at <<http://cogprints.org/1796/1/ECML2001.ps>>, 12 pages.
Venetis, et al., "Recovering Semantics of Tables on the Web", Proceedings of the VLDB Endowment, vol. 4, Issue 9, Jun. 2011, 10 pages.
Wang, et al., "Targeted Disambiguation of Ad-hoc, Homogeneous Sets of Named Entities," retrieved at <<http://acm.org>>, Proceedings of the 21st International Conference on World Wide Web, Apr. 2012, pp. 719-728.
Watanabe, et al., "A Graph-based Approach to Named Entity Categorization in Wikipedia Using Conditional Random Fields," retrieved at <<http://www.aclweb.org/anthology-new/D/D07/D07-1068.pdf>>, Proceedings of the 2007 Joint Conference on Empirical Methods in Natural Language Processing and Computational Natural Language Learning, Jun. 2007, pp. 649-657.
Wen, et al., "Clustering User Queries of a Search Engine," Proceedings of the 10th International Conference on World Wide Web, 2001, accessible <<http://research.microsoft.com/users/jrwen/jrwen_files/publications/QC-WWW1 O.pdf>>, pp. 162-168.
Yakout, et al., "InfoGather: Entity Augmentation and Attribute Discovery by Holistic Matching with Web Tables," retrieved at <<http://acm.org>>, Proceedings of the 2012 International Conference on Management of Data, May 2012, pp. 97-108.
Yin, et al., "Facto: A Fact Lookup Engine Based on Web Tables", In WWW, Mar. 28-Apr. 1, 2011, Hyderabad, India, 10 pages (cited in Apr. 2, 2013 OA, MS# 334531.01).
Zhai, et al., "A Study of Smoothing Methods for Language Models Applied to Ad Hoc Information Retrieval," Proceedings of the 24th Annual International ACM SIGIR Conference on Research and Development in Information Retrieval, 2001, accessible at <<http://ciir.cs.umass.edu/irchallenges/smooth.pdf>>, 9 pages.
International Search Report and Written Opinion, Mailed Jun. 26, 2013, From PCT Patent Application No. PCT/US2013/027203, 10 pages. (MS Ref. 334531.02).
Supplemental EP Search Report dated Mar. 4, 2014 in Appln No. 13757813.4, 3 pgs. (MS# 334531.04).
Preliminary Report on Patentability, From PCT Application No. PCT/US2013/027203 Mailed Sep. 9, 2014.
EP Examination Report dated Mar. 11, 2015 in Appln No. 13757813.4, 4 pgs. (MS# 334531.04).
U.S. Official Action dated Feb. 16, 2011 in U.S. Appl. No. 12/235,635, 16 pgs. (MS# 325036.01).
U.S. Official Action dated May 23, 2011 in U.S. Appl. No. 12/465,832, 19 pgs. (MS# 326642.01).
Response dated Jul. 18, 2011 in U.S. Appl. No. 12/235,635, 27 pgs. (MS# 325036.01).
Response dated Aug. 16, 2011 in U.S. Appl. No. 12/465,832, 17 pgs. (MS# 326642.01).
U.S. Official Action dated Oct. 7, 2011 in U.S. Appl. No. 12/465,832, 14 pgs. (MS# 326642.01).
U.S. Official Action dated Oct. 25, 2011 in U.S. Appl. No. 12/235,635, 16 pgs. (MS# 325036.01).
U.S. Official Action dated Nov. 3, 2011 in U.S. Appl. No. 12/478,120, 9 pgs. (MS# 326644.01).
Response dated Dec. 22, 2011 in U.S. Appl. No. 12/465,832, 17 pgs. (MS# 326642.01).
Response dated Jan. 27, 2012 in U.S. Appl. No. 12/235,635, 23 pgs. (MS# 325036.01).
Response dated Feb. 3, 2012 in U.S. Appl. No. 12/478,120, 15 pgs. (MS# 326644.01).
U.S. Official Action dated Feb. 14, 2012 in U.S. Appl. No. 12/779,964, 14 pgs. (MS# 328870.01).
U.S. Official Action dated Feb. 27, 2012 in U.S. Appl. No. 12/478,120, 20 pgs. (MS# 326644.01).
Response dated Mar. 25, 2012 in U.S. Appl. No. 12/235,635, 32 pgs. (MS# 325036.01).
U.S. Official Action dated Apr. 10, 2012 in U.S. Appl. No. 12/465,832, 20 pgs. (MS# 326642.01).
Response dated Jun. 11, 2012 in U.S. Appl. No. 12/779,964, 12 pgs. (MS# 328870.01).
Response dated Jun. 27, 2012 in U.S. Appl. No. 12/478,120, 15 pgs. (MS# 326644.01).
Response dated Jul. 10, 2012 in U.S. Appl. No. 12/465,832, 17 pgs. (MS# 326642.01).
U.S. Official Action dated Aug. 27, 2012 in U.S. Appl. No. 12/779,964, 24 pgs. (MS# 328870.01).
U.S. Official Action dated Sep. 19, 2012 in U.S. Appl. No. 12/465,832, 20 pgs. (MS# 326642.01).
Response dated Nov. 1, 2012 in U.S. Appl. No. 12/779,964, 17 pgs. (MS# 328870.01).
Response dated Dec. 18, 2012 in U.S. Appl. No. 12/465,832, 19 pgs. (MS# 326642.01).
U.S. Official Action dated Mar. 7, 2013 in U.S. Appl. No. 13/487,260, 32 pgs. (MS# 335746.02).
U.S. Official Action dated Apr. 2, 2013 in U.S. Appl. No. 13/413,179, 30 pgs. (MS# 334531.01).
Notice of Allowance dated Jun. 6, 2013 in U.S. Appl. No. 12/478,120, 24 pgs. (MS# 326644.01).
U.S. Official Action dated Jun. 13, 2013 in U.S. Appl. No. 12/465,832, 17 pgs. (MS# 326642.01).
Response dated Jul. 30, 2013 in U.S. Appl. No. 12/465,832, 26 pgs. (MS# 326642.01).
Response dated Aug. 6, 2013 in U.S. Appl. No. 13/487,260, 15 pgs. (MS# 335746.02).
Response dated Sep. 3, 2013 in U.S. Appl. No. 13/413,179, 15 pgs. (MS# 334531.01).
U.S. Official Action dated Sep. 12, 2013 in U.S. Appl. No. 13/531,493, 21 pgs. (MS# 336389.01).
Notice of Allowance dated Oct. 17, 2013 in U.S. Appl. No. 13/487,260, 11 pgs. (MS# 335746.02).
U.S. Official Action dated Oct. 21, 2013 in U.S. Appl. No. 12/465,832, xx pgs. (MS# 326642.01).
U.S. Official Action dated Nov. 18, 2013 in U.S. Appl. No. 12/235,635, 31 pgs. (MS# 325036.01).
U.S. Official Action dated Nov. 19, 2013 in U.S. Appl. No. 12/779,964, 29 pgs. (MS# 328870.01).
U.S. Official Action dated Dec. 5, 2013 in U.S. Appl. No. 13/413,179, 31 pgs. (MS# 334531.01).
Response dated Dec. 23, 2013 in U.S. Appl. No. 13/531,493, 14 pgs. (MS# 336389.01).
Notice of Allowance dated Jan. 21, 2014 in U.S. Appl. No. 13/487,260, 33 pgs. (MS# 335746.02).
U.S. Official Action dated Feb. 3, 2014 in U.S. Appl. No. 13/531,493, 12 pgs. (MS# 336389.01).
Response dated Feb. 17, 2014 in U.S. Appl. No. 12/235,635, 14 pgs. (MS# 325036.01).
Response dated Feb. 18, 2014 in U.S. Appl. No. 12/779,964, 17 pgs. (MS# 328870.01).
Supplemental Response dated Mar. 11, 2014 in U.S. Appl. No. 12/235,635, 10 pgs. (MS# 325036.01).
Response dated Apr. 30, 2014 in U.S. Appl. No. 13/531,493, 13 pgs. (MS# 336389.01).
Notice of Allowance dated May 23, 2014 in U.S. Appl. No. 12/235,635, 17 pgs. (MS# 325036.01).

(56) References Cited

OTHER PUBLICATIONS

U.S. Official Action dated Jun. 3, 2014 in U.S. Appl. No. 12/779,964, 26 pgs. (MS# 328870.01).
Response dated Jun. 5, 2014 in U.S. Appl. No. 13/413,179, 19 pgs. (MS# 334531.01).
Notice of Allowance dated Aug. 20, 2014 in U.S. Appl. No. 13/531,493, 22 pgs. (MS# 336389.01).
Notice of Allowance dated Aug. 29, 2014 in U.S. Appl. No. 12/235,635, 24 pgs. (MS# 325036.01).
Response dated Sep. 25, 2014 in U.S. Appl. No. 13/531,493, 11 pgs. (MS# 336389.01).
Response dated Oct. 2, 2014 in U.S. Appl. No. 12/779,964, 20 pgs. (MS# 328870.01).
Notice of Allowance dated Dec. 11, 2014 in U.S. Appl. No. 12/235,635, 32 pgs. (MS# 325036.01).
U.S. Official Action dated Jan. 15, 2015 in U.S. Appl. No. 13/413,179, 49 pgs. (MS# 334531.01).
U.S. Official Action dated Jan. 15, 2015 in U.S. Appl. No. 13/527,601, 13 pgs. (MS# 336388.01).
Notice of Allowance dated Mar. 18, 2015 in U.S. Appl. No. 13/531,493, 60 pgs. (MS# 336389.01).
Notice of Allowance dated Apr. 7, 2015 in U.S. Appl. No. 12/235,635, 25 pgs. (MS# 325036.01).
Response dated Apr. 14, 2015 in U.S. Appl. No. 13/527,601, 12 pgs. (MS# 336388.01).
Response dated Apr. 15, 2015 in U.S. Appl. No. 13/413,179, 23 pgs. (MS# 334531.01).
U.S. Official Action dated Apr. 29, 2015 in U.S. Appl. No. 12/779,964, 44 pgs. (MS# 328870.01).
Notice of Allowance dated May 22, 2015 in U.S. Appl. No. 12/235,635, 21 pgs. (MS# 325036.01).

* cited by examiner

WORD DETECTION AND DOMAIN DICTIONARY RECOMMENDATION

BACKGROUND

With the great increase in Internet functionality, information transfer and electronic document production and use, more and more new words are being created and spread among users, and more and more words are being used in electronic document creation and use that are associated with a variety of different domain dictionaries.

When new words are received from one or more sources, for example, an Internet web page, electronic mail message, text message, electronic document, or the like, such words may not be recognized as belonging to a given domain dictionary, for example, a domain dictionary associated with a word processing application, and thus, such functionalities as text input methods, spellchecking, grammar checking, auto entry completion, and the like, may not be available for those new words. This may be particularly problematic with complex languages such as the Chinese language that are comprised of strings of characters not broken into words by spaces or other demarcation or separation indicia.

In addition, oftentimes a user may be inputting information (e.g., text) via a given software functionality, for example, a word processing application, that is associated with a given domain dictionary, for example, a standard English language, Chinese language, or other standard language domain dictionary, but the user may be inputting text associated with a more particular domain, for example, a medical terminology domain. If the user is not aware of the availability of the domain dictionary (e.g., a medical terminology domain dictionary) associated with his/her text input, the user may be losing the valuable resources of the available domain dictionary.

It is with respect to these and other considerations that the present invention has been made.

SUMMARY

Embodiments of the present invention solve the above and other problems by providing new word detection and domain dictionary recommendation. According to one embodiment, when text content is received according to a given language, for example, Chinese language, words are extracted from the content by analyzing the content according to a variety of rules, including a stop word rule, a lexicon sub-string and number sequence rule, a prefix/suffix rule and a language pattern rule. After words of low value for addition to a word lexicon as new words are eliminated, remaining words are ranked for inclusion into one or more word lexicons and/or particular domain dictionaries for future use for such functionalities as text input methods, spellchecking, grammar checking, auto entry completion, definition, and the like.

According to another embodiment, when a user is entering or editing text according to one or more prescribed domain dictionaries, a determination may be made as to whether more helpful domain dictionaries may be available. Words entered by the user are extracted and are compared with words contained in a variety of available domain dictionaries. If a determination is made that words entered by the user have a high degree of association with a domain dictionary not in use by the user, that domain dictionary may be recommended to the user to increase the accuracy of the user's input of additional text and editing of existing text.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention.

DETAILED DESCRIPTION

Figure 1:
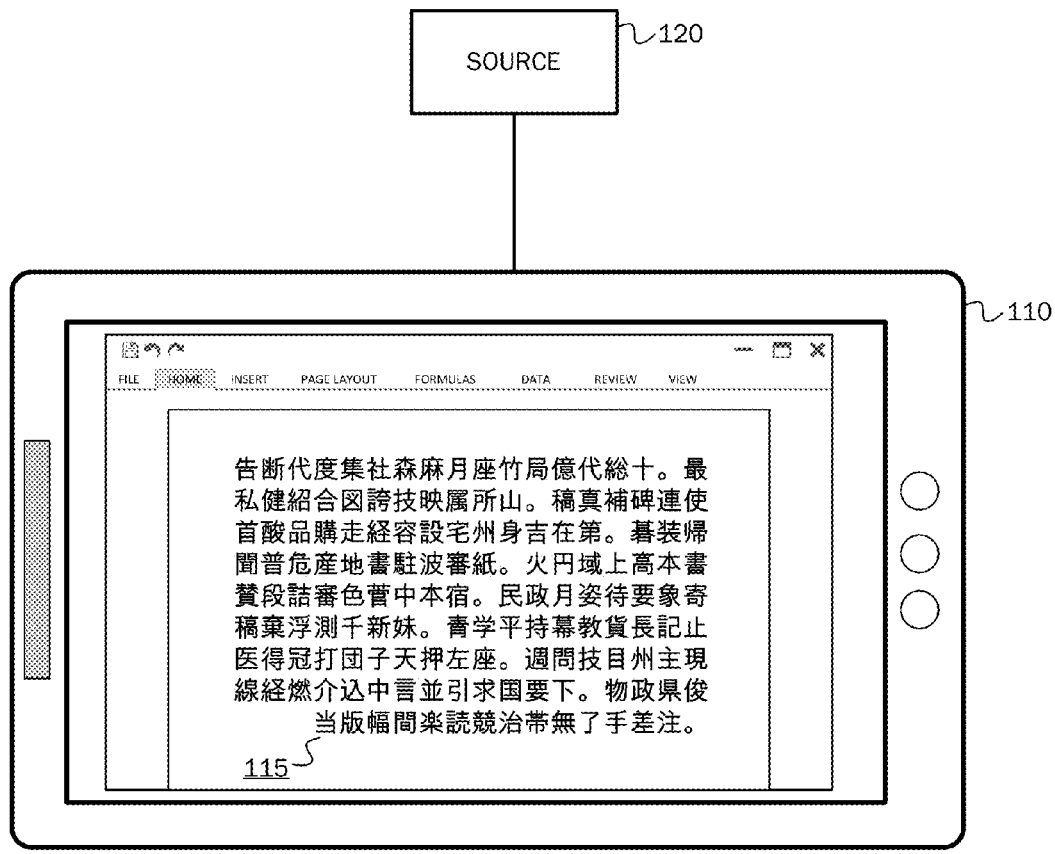
FIG. 1 illustrates textual content according to a particular language, for example, Chinese language, displayed on a display screen of a tablet-type computing device from which one or more new words may be detected for inclusion in a given domain dictionary.

As briefly described above, embodiments of the present invention are directed to providing new word detection and domain dictionary recommendation. When text content is received according to a given language, for example, Chinese language, words are extracted from the content by analyzing the content according to a variety of rules. After words of low value for addition to a given domain dictionary as new words are eliminated, remaining words are ranked for inclusion into one or more word lexicons and/or particular domain dictionaries for future use for such functionalities as text input methods, spellchecking, grammar checking, auto entry completion, definition, and the like. In addition, when a user is entering or editing text according to one or more prescribed domain dictionaries, a determination may be made as to whether more helpful domain dictionaries may be available. If a determination is made that words entered by the user have a high degree of association with a domain dictionary not in use by the user, that domain dictionary may be recommended to the user to increase the accuracy of the user's input of additional text and editing of existing text.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to FIG. 1, a textual content selection 115 is illustrated on a display screen of a computing device 110 that may be read, edited, or otherwise utilized by a user according to a variety of software functionalities, for example, word processing applications, Internet-based applications, slide presentation applications, spreadsheet applications, desktop publishing applications, and the like. The computing device 110 illustrated in FIG. 1 is a tablet-type computing device, but as should be appreciated, the computing device 110 may take any suitable form, for example, a laptop computer, a desktop computer, a handheld computing device, for example, a smart telephone, and the like that is capable of allowing the textual content 115 to be displayed and utilized according to one or more software functionalities. As illustrated in FIG. 1, the textual content 115 is Chinese language content, but as should be understood, the textual content 115 may be provided according to any other language type desired by the user of the device 110. A source 120 is illustrated from which the textual content 115 may be obtained, for example, an Internet-based web page, a remotely stored document, an electronic mail message, a text message, a locally stored document, and the like.

As briefly described above, when textual content, such as the textual content illustrated in FIG. 1, is received from a source 120, the textual content may have one or more new words that may or may not be understood by the user or other receiving party and/or may not be included in a domain dictionary available to the user, for example, one or more domain dictionaries associated with the user's word processing application, or other software application with which the received content is to be utilized. Thus, various functionalities, for example, text input methods, spellchecking, grammar checking, auto entry completion, dictionary services, and the like may not be available for such new words. For example, the received textual content 115 may include a new word that is new to a given industry, for example, the software industry, Internet industry, or the like that may be understood by the receiving user, but that may not be included in a given domain dictionary for assisting the user in utilizing the new word according to available software functionalities.

Figure 2:
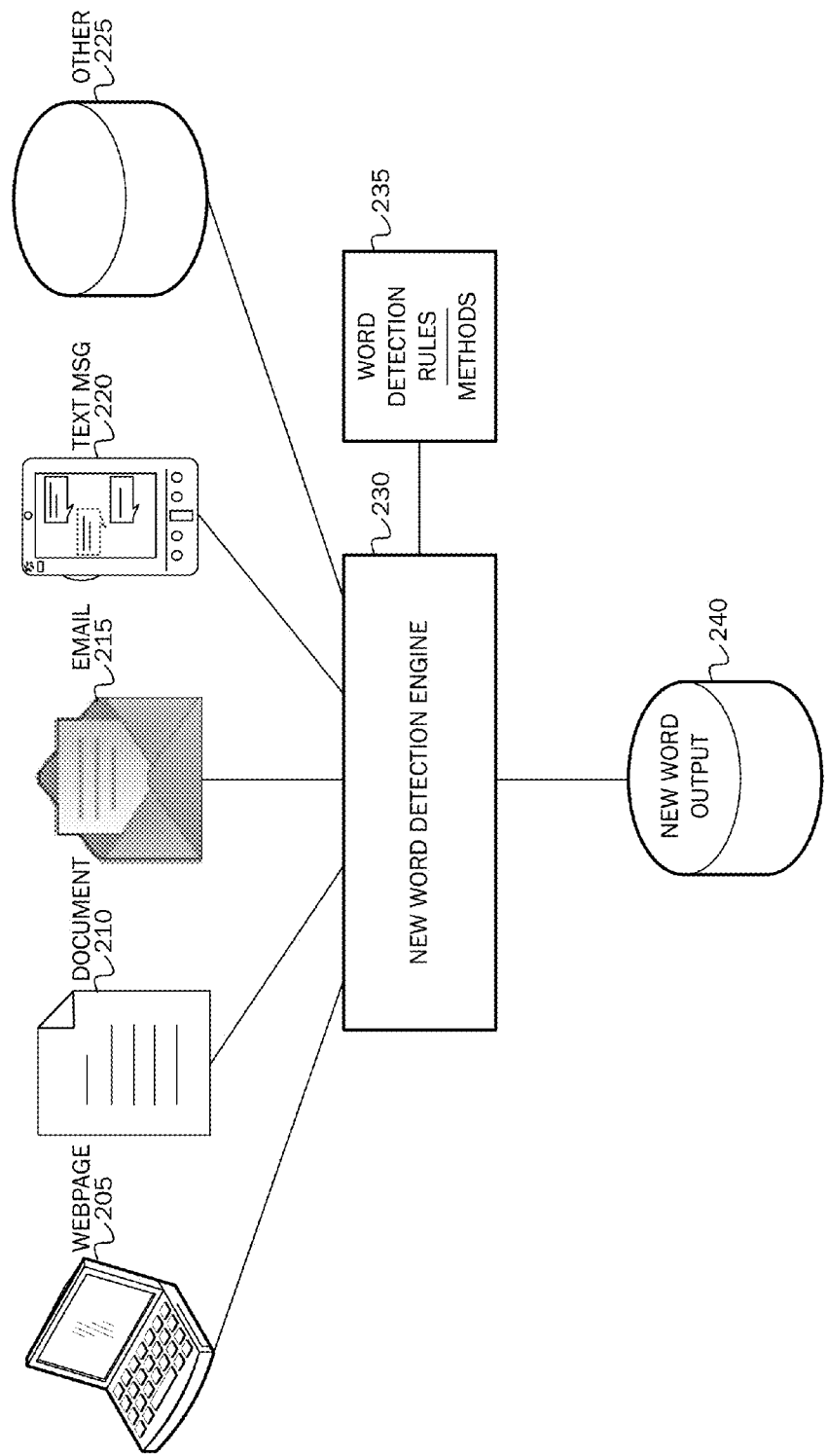
FIG. 2 illustrates a system architecture for receiving textual content from one or more sources and for detecting one or more new words from the textual content via a new word detection engine.

Referring now to FIG. 2, according to embodiments of the present invention, textual content received from a variety of sources, for example, the web page 205, the electronic document 210, the electronic mail message 215, the text message 220, or other content sources 225 may be passed to a new word detection engine 230 for isolation of new words contained in the received textual content item and for inclusion in one or more word lexicons (lists of words) and/or given domain dictionaries (lists of words associated with a particular domain, e.g., medical terminology domain) for subsequent use in association with one or more software functionalities. For example, if a new word of "texting" is received in a textual content item from one or more sources, the new word may be understood by a receiving user, but the new word may not be included in any domain dictionaries associated with software functionalities in use by the user, for example, text input method applications, word processing applications, electronic mail applications, and the like. By isolation of and inclusion of the new word in a given domain dictionary, software functionalities associated with text content entry and editing may be utilized in association with the domain dictionary and the newly isolated and stored word. For example, if a user is subsequently enters or edits the example word "texting," a domain dictionary associated with the user's text input method application or word processing application to which the new word has been added may be utilized by the user's word processing application for assisting the user in properly entering the word, spelling the word, grammar checking use of the word in association with other words, providing dictionary services associated with the word, and the like.

According to embodiments, when textual content 115 is received or entered, as described herein, the new word detection engine 230 utilizes a variety of word detection rules/methods 235 for determining whether portions of the textual content include new words and for ranking determined new words for possible output to one or more domain dictionaries 265 for subsequent use. As described below, some of the rules/methods 235 may be used for eliminating candidate new words that are not considered meaningful for adding to a given domain dictionary as a new word.

Referring still to FIG. 2, a stop word rule may be used for eliminating text strings having a head or tail associated with one or more prescribed stop words where such stop words may be considered noise level textual content items and not meaningful for inclusion in a given domain dictionary. For determining whether a portion of text may be a stop word, portions of the text content may be extracted and compared against lists of known stop words. For example, such stop words as commonly used transitional phrase words, articles, verbs, and the like, for example, "a," "and," "the," and the like, may be eliminated so that they are not needlessly analyzed further and added to a domain dictionary as a new word. As should be appreciated, these example stop words are merely three example English language stop words and are not exhaustive of the vast number of stop words that are utilized according to a variety of languages, for example, Chinese language, English language, French language, Arabic language, and the like and that are well known and well understood by those skilled in the art of linguistics.

A lexicon sub-string and number sequences rule may be utilized for eliminating strings that are sub-strings of other words or number sequences contained in one or more domain dictionaries where the inclusion of such sub-strings do not provide for meaningful inclusion in one or more domain dictionaries. That is, character strings contained in a given text content that are merely sub-strings of words contained in a lexicon of words or sub-strings of a number sequence contained in a lexicon of words may be eliminated because they are of little value in adding to a domain dictionary or lexicon of words or terms as a new word or term. For example, of the word "diction" is found to be a sub-string of the word "dictionary" already included in one or more lexicons or domain dictionaries, then the sub-string of "diction" may be eliminated as a candidate new word. According to an embodiment, this rule may be advantageous because when a word is in a lexicon, and if one of its sub-strings is not in the lexicon, then the sub-string is not a meaningful word. Likewise, number sequences, for example, a number sequence of "2012" used for indicating a year may not be meaningful for adding to a lexicon or domain dictionary as a new word and thus may be eliminated. For determining whether a portion of text contains a sub-string or number sequence, portions of received or input text may be compared by the new word detection engine 230 against lists of known strings, and number sequences may be detected by determining one or more characters are sequences of numbers that are not part of a given word or term.

After some words, phrases or number sequences are eliminated as described above, statistical methods may be utilized for scoring remaining candidates for possible inclusion in a lexicon of words or domain dictionary as described herein. As should be appreciated a variety of statistical methods may be employed for scoring a given word so that highly scored or ranked words may be included in the lexicon or domain dictionary and so that lower scored or ranked words may be discarded. For example, a term frequency for a given word may be determined, and words appearing very frequently in a given text selection may be scored highly. Such determinations may be refined by combining such determinations with other statistical information. For example, if a word has a high term frequency, but only appears in association with another word that is not considered meaningful, then the high term frequency for the word may be less important. For another example, the contextual independency of a word may be considered where a higher or lower score for the word may be determined based on the dependency or association of the word on or with other words in an analyzed text selection.

According to one embodiment, the statistical methods allow for calculation of six (6) statistical scores for any candidate word w, composed of characters $c_1 \ldots c_n$. The statistical methods may use lexicon sub-string and number sequences rule described above and the prefix/suffix rule described below for refining the statistical information determined for a given word.

A first statistical score for a given word may include a term frequency (TF) which may be determined for each word extracted from a received or input text content 115 as set out below. TF is the term frequency of the word and length is the textual length of the word.

$$TF(w) = tf_w * \text{length}_w$$

A second statistical score may include a fair symmetric conditional probability (FSCP) may be determined for the word, and the FSCP may be used to measure the contextual independency of the word and the cohesiveness of generic n-gram (n>=2) for the word relative to other words. The FSCP for the word may be determined as follows.

$$FSCP(c_1 \ldots c_n) = \frac{P(c_1 \ldots c_n)^2}{Avp}$$

$$Avp = \frac{1}{n-1} \sum_{i=1}^{n-1} P(c_1 \ldots c_i) * P(c_{i+1} \ldots c_n)$$

A third statistical score may include an adapted mutual information (AMI) score. The AMI score allows a determination as to whether a character pattern for a given word $c_1 \ldots c_l$ is more complete in semantics than any substrings that compose the word, especially on longest composed substrings. The AMI score may be determined as follows.

$$AMI(c_1 \ldots c_n) = \frac{P(c_1 \ldots c_n)}{P(c_2 \ldots c_n) + P(c_1 \ldots c_{n-1}) - P(c_1 \ldots c_n)} = \frac{tf(c_1 \ldots c_n)}{tf(c_2 \ldots c_n) + tf(c_1 \ldots c_{n-1}) - tf(c_1 \ldots c_n)}$$

A fourth statistical score may include a context entropy score. For a context entropy score neighboring words (x) of an analyzed word (w) are collected and the frequencies of the neighboring words (x) are determined. The context entropy of the analyzed word (w) may be determined as follows.

$$H_C(w) = -\sum_x p(x) \log p(x)$$

A fifth statistical score may include a prefix/suffix ratio of a given word relative to other words to with the given word is associated as a prefix/suffix. As set out above, an analyzed word may be discarded if it is determined merely to be a prefix or suffix of one or more other words in a given text selection. A prefix/suffix ratio for a given word may be determined as follows.

$$PSR(c_1 \ldots c_n) = \max_{2 \leq i < n} \left( \frac{tf(c_1 \ldots c_i)}{tf(c_{i+1} \ldots c_n)} \right)$$

A sixth statistical score for an analyzed word may include a biased mutual dependency (BMD) score for determining dependencies between analyzed words and a plurality of other words in a text selection. A BMD score for a given word may be determined as follows.

$$BMD(c_1 \ldots c_n) =$$
$$\max_{2 \leq i < n} \left( \log \frac{p(c_1 \ldots c_n)^2}{p(c_1 \ldots c_i) p(c_{i+1} \ldots c_n)} + \log p(c_1 \ldots c_n) \right)$$

According to this embodiment, after the six (6) statistical scores are determined for a given word, a language pattern rule may be used for adjusting the scores. For example, according to a Chinese language word analysis, a Chinese pattern rule may be used to adjust the scores using a linear model to adjust FSCP and AMI may as follows.

$$\text{Score}_{fscp}(w) = FSCP(w) + \text{delta}_{fscp} * \text{Pattern}(w)$$

$$\text{Score}_{mi}(w) = AMI(w) + \text{delta}_{mi} * \text{Pattern}(w)$$

According to a Chinese pattern analysis example, a Chinese pattern analysis may not be used for term frequency (TF) score adjustment because TF(w) is typically a very large number, and the Pattern(w) is between 0~1. The delta$_{fscp}$ may be set to 0.01, 0.05, 0.1 for testing because the FSCP($c_1 \ldots c_n$) is may not be too large (e.g., 0~0.4), and Pattern(w) is typically very large (e.g., 0.6~1), so the delta$_{fscp}$ may not be set large to let the Pattern(w) become dominant. Such example parameters may be obtained by experimentation. Continuing with this example, the delta, may be set to 0.1, 0.5, 1 for testing because the AMI(w) is typically as large (e.g., 0.6~1) as (w). According to an embodiment, these parameters may be obtained by experimentation and testing.

As should be appreciated, when multiple statistical scores are determined for a given analyzed word, the multiple scores may be combined for obtaining a single score that may be used for determining whether the word should be added to a lexicon or domain dictionary. For example, continuing with the above example embodiment, a total score combining all the six (6) scores described above may be combined into a single score by a log-linear formula as follows.

$$TOTAL(w) = \lambda_1 TF(w) + \lambda_2 FSCP(w) + \lambda_3 AMI(w) + \lambda_4 H_C(w) + \lambda_5 PSR(w) + \lambda_6 BMD(w)$$

According to this example embodiment, the values of the 6$\lambda$'s may be obtained by numerical optimization over a number of training instances. There are positive training instances (sequences in which are words determined as words for adding to a lexicon) and negative instances (sequences in which words are discarded). Positive training instances may be provided by automated and human selection. The negative training instances, which may not be reliably provided by human selection, may be selected from lists of candidate words ranked by each of the six statistical scores/measures described above. If a candidate word is ranked low by at least three statistical measures, then it may be selected as a negative training instance.

Referring still to FIG. 2, the prefix/suffix rule 255 provides for eliminating words or phrases that are prefixes or suffixes or other words or phrases. After a score is calculated for a given word as described above, some candidates may be eliminated via the prefix/suffix rule 255 where a score for a prefix or suffix word is no greater than the words containing them. That is, the sub-string comprising the prefix or suffix is less meaningful (based on scoring) than the words to which the sub-strings belong. Thus, a string (word) comprising including such a prefix or suffix should not be split to the sub-string (prefix or suffix), and therefore, the sub-string may be removed as a candidate word for inclusion in a lexicon or domain dictionary.

As described above, the language pattern rule 260 allows for analyzing the patterns of characters for adjusting scores determined for candidate words. For example, if a word contains characters "abc," the language pattern rule may be used for determining a probability that a character may be in the first position or in the middle or in the tail of a candidate word for adjusting the score for the candidate word. For example, according to an example embodiment using a Chinese pattern rule, a text character's position may be used for determining the probability the character is a Chinese character. According to this example Chinese language embodiment, a unigram statistic is first calculated from original lexicon and trigram statistic to get the list of <word, tf> pairs. Next, a character statistic is calculated from a unigram statistic to get a list of <char,<head$_{tf}$,mid$_{tf}$,tail$_{tf}$>> pairs. That is, for a character, its frequency is calculated in the head, middle and tail position in the unigram statistic, respectively. These steps comprise preprocessing for the Chinese pattern rule. Then, for each character, the probability of each position in which the character may occur may be calculated as follows.

$$P(pos) = \frac{pos_{tf}}{head_{tf} + mid_{tf} + tail_{tf}}$$

The list of <char,<head$_{prob}$, mid$_{prob}$, tail$_{prob}$>> pairs is thus obtained. Two conditions may then be considered, for example, a word w=$c_1 c_2 c_3 \ldots c_n$. One condition may include only head and tail probabilities as follows.

$$Pattern(w) = (P(c_1, head_{prob}) * P(c_n, tail_{prob}))^{\frac{1}{2}}$$

Another condition may include all positions as follows.

$$Pattern(w) = (P(c_1, head_{prob}) * P(c_2, mid_{prob}) * \ldots * P(c_{n-1}, mid_{prob}) * P(c_n, tail_{prob}))^{\frac{1}{n}}$$

Figure 3:
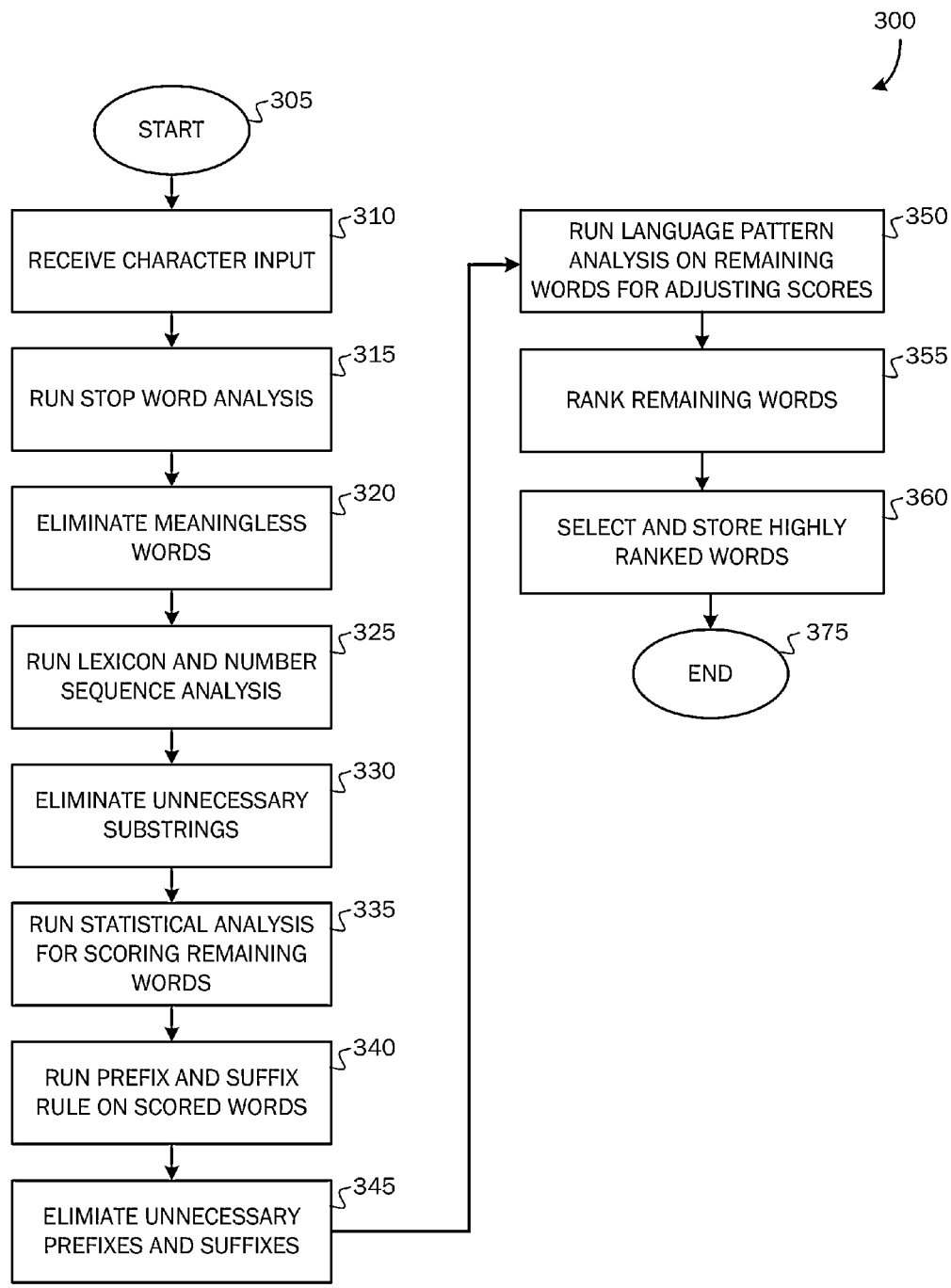
FIG. 3 is a flow chart of a method for detecting new words contained in a received or input text content selection.

FIG. 3 is a flow chart of a method for detecting new words contained in a received or input text content selection. The method 300 begins at start operation 305 and proceeds to operation 310 where textual content in the form of a number of words or character strings is received from one or more sources 205, 210, 215, 220, 225, as illustrated and described above with reference to FIG. 2. Word segmentation may next be performed for separating input or received textual content into individual words for subsequent analysis of segmented words as described below. As should be appreciated, textual content may be broken into words according to a variety of methods. Textual content may be broken into words via one or more word breaker methods, for example, by breaking words at spaces between groupings of characters or before or after known head and tail characters. However, for some languages such as Chinese, traditional word breaking methods are less effective because spaces and other demarcation indicators are not provided between words. In such cases, other methods may be utilized for quickly grouping characters into words.

According to one method, a positive maximum match method may be employed for segmenting such language types (e.g., Chinese) into words. The positive maximum match method is not sensitive to the size of a given lexicon of words. According to this method, characters are grouped together one by one up to a maximum number (e.g., 9 characters), and each grouping may be treated as a word for comparing against a lexicon for isolating the grouping as a word. Regardless of the method of segmenting textual content into words, once textual content is segmented into words, the segmented words analyzed for determination as a new word for inclusion into a word lexicon or domain dictionary as described below.

At operation 315, the stop word rule 240 may be run against the received textual content for eliminating one or more stop words contained in the received textual content. At operation 320, stop words isolated and determined for the received textual content are eliminated as being of low value or meaningless for new word detection and determination.

At operation 325, the lexicon sub-string and number sequence rule may be run against the remaining textual content, and at operation 330, unnecessary sub-strings may be eliminated from the remaining textual content as lacking importance or meaning in the determination of new words contained in the received textual content.

At operation 335, the statistical methods 250, described above, are run against remaining textual content for scoring words contained in the remaining textual content for determination as new words for including in one or more lexicons and/or domain dictionaries.

At operation 340, the prefix/suffix rule 255 may be run against scored words extracted from the received textual content. At operation 345, unnecessary prefixes and suffixes may be eliminated for further reducing the number of textual content items that may be determined as new words contained in the received textual content.

At operation 350, language pattern analysis, for example, Chinese language pattern analysis, may be run on remaining words for adjusting scores applied to the remaining words extracted from the received textual content. At operation 355, the remaining words are ranked for inclusion in one or more word lexicons and/or domain dictionaries as new words, and at operation 360, highly ranked words may be selected and stored as new words for inclusion in one or more word lexicons and/or domain dictionaries. As should be appreciated, the scores and associated ranking that are required for including a word in a given lexicon or domain dictionary may be different for different languages and domain types. That is, scores and associated ranking may be determined acceptable for word detection and selection at varying levels for making the word detection methods described above more or less selective as desired for different text content. According to one embodiment, after one or more words are added to a given word lexicon or domain dictionary, the word lexicon or domain dictionary may be recommended to a user for association with a given software functionality, for example text input methods or word processing. The method 300 ends at operation 375.

As briefly described above, according to embodiments, users enter and edit textual content selections entered via various input methods and received from various sources. A given software application in use by a user, for example, a word processing application, slide presentation application, Internet web page functionality application, and the like may be associated with a given domain dictionary, for example, a standard grammar lexicon associated with a given language, for example, Chinese, English, French, Arabic, or the like. However, if the textual content being entered and/or edited by the user is more closely associated with a particular domain dictionary, for example, a medical terminology domain dictionary, an engineering terminology domain dictionary, a biological sciences domain dictionary, or the like, the user may be losing valuable resources of one of these particular or specialized domain dictionaries that may be available to the user for use in association with the entered and/or edited textual content.

For example, if the user is entering and/or editing textual content that contains a number of medical terms, if the user has not associated the software application in use, for example, a word processing application, with an available medical terminology domain dictionary, then valuable resources, for example, input method assistance, spellchecking, grammar checking, auto entry completion, dictionary services, and the like may not be available to the user in association with the entered and/or received textual content. According to embodiments, textual content entered and/or edited by a user may be analyzed for association with one or more domain dictionaries not in use by the user in association with the textual content, and one or more domain dictionaries that may be helpful in association with the entered and/or edited textual content may be recommended to the user.

Figure 4:
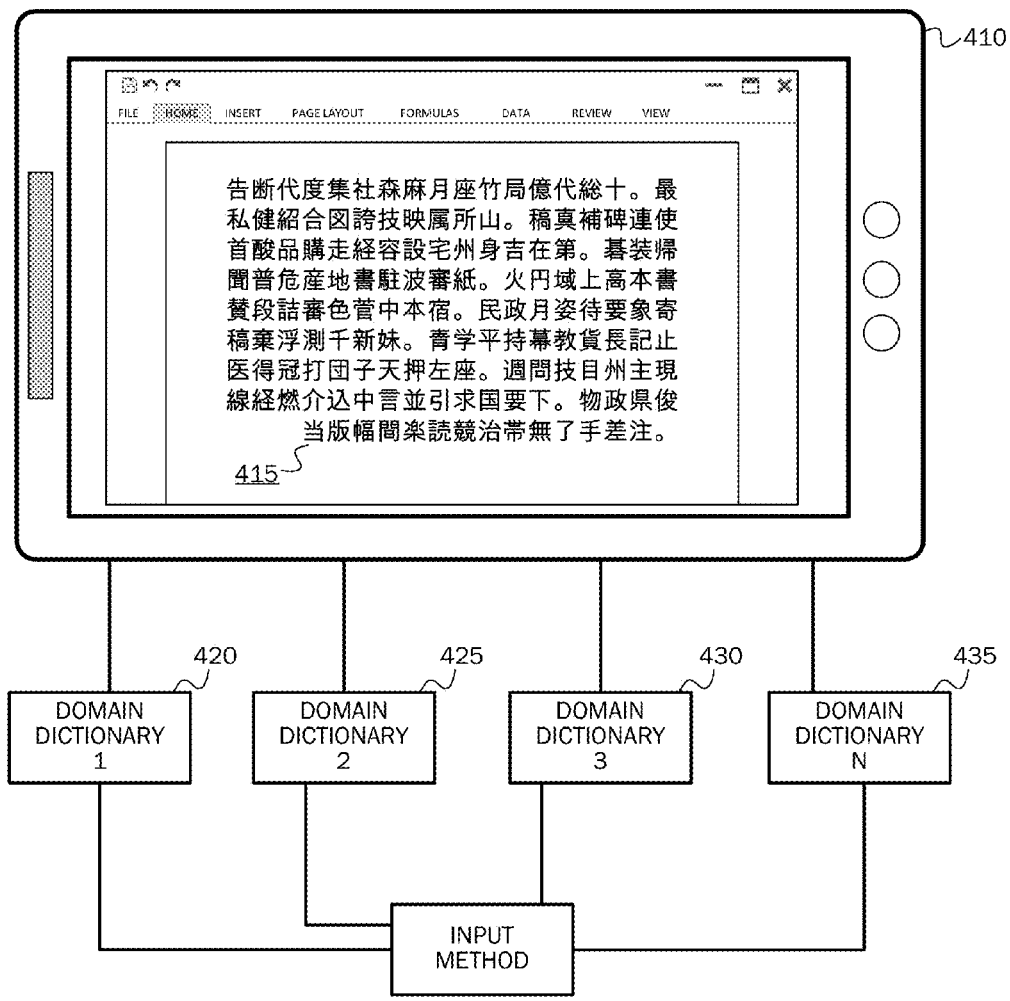
FIG. 4 illustrates a system architecture for domain dictionary recommendation for received or input textual content.

Referring now to FIG. 4, example textual content 415 is illustrated on the display screen of a computing device 410 being entered and/or edited, and/or received by a user for use in association with one or more software functionalities. A number of domain dictionaries 420, 425, 430, 435 are illustrated that may be associated with the textual content 415 for assisting a user in association with an input method 440 with which the user may input additional textual content, edit input or edit received textual content. For example, an input method editor (IME) may be associated with an input device (e.g., a keyboard) for assisting a user to input text for a language not otherwise enabled by the input device. For example, an English language keyboard may be associated with a Chinese language IME. A domain dictionary associated with the IME may assist in input and editing of text entered via the Chinese language IME in association with the English language keyboard. As illustrated in FIG. 4, the textual content 415 is provided according to the Chinese language. As should be appreciated, the Chinese language is but one example of a variety of different textual content languages that may be utilized in accordance with embodiments of the present invention for recommending one or more available domain dictionaries for use in association with a given textual content.

Referring still to FIG. 4, the domain dictionary 420 may be a domain dictionary containing standard language lexicon, grammar and dictionary services associated with a given language, for example, the Chinese language, the English language, the French language, and the like. On the other hand, the domain dictionaries 425, 430, 435 may be associated with particular domain types, for example, medical terminology domain, engineering terminology domain, biological sciences terminology domain, and the like. As should be appreciated, a great number of domain dictionaries may be provided for use in association with textual content that are associated with a variety of different topics and/or ideas.

Referring still to FIG. 4, the domain dictionary recommendation engine 445 is illustrative of a software module containing sufficient computer executable instructions for analyzing a textual content and for comparing the textual content to one or more domain dictionaries for recommending one or more domain dictionaries for use in association with the textual content. According to one embodiment, when a user is using a given input method editor (IME), for example, a Chinese IME with an English language keyboard, text being input or edited by a user may be analyzed for recommending one or more additional domain dictionaries that may be associated with the IME in use for allowing the user greater input and/or editing accuracy via the one or more additional domain dictionaries.

Figure 5:
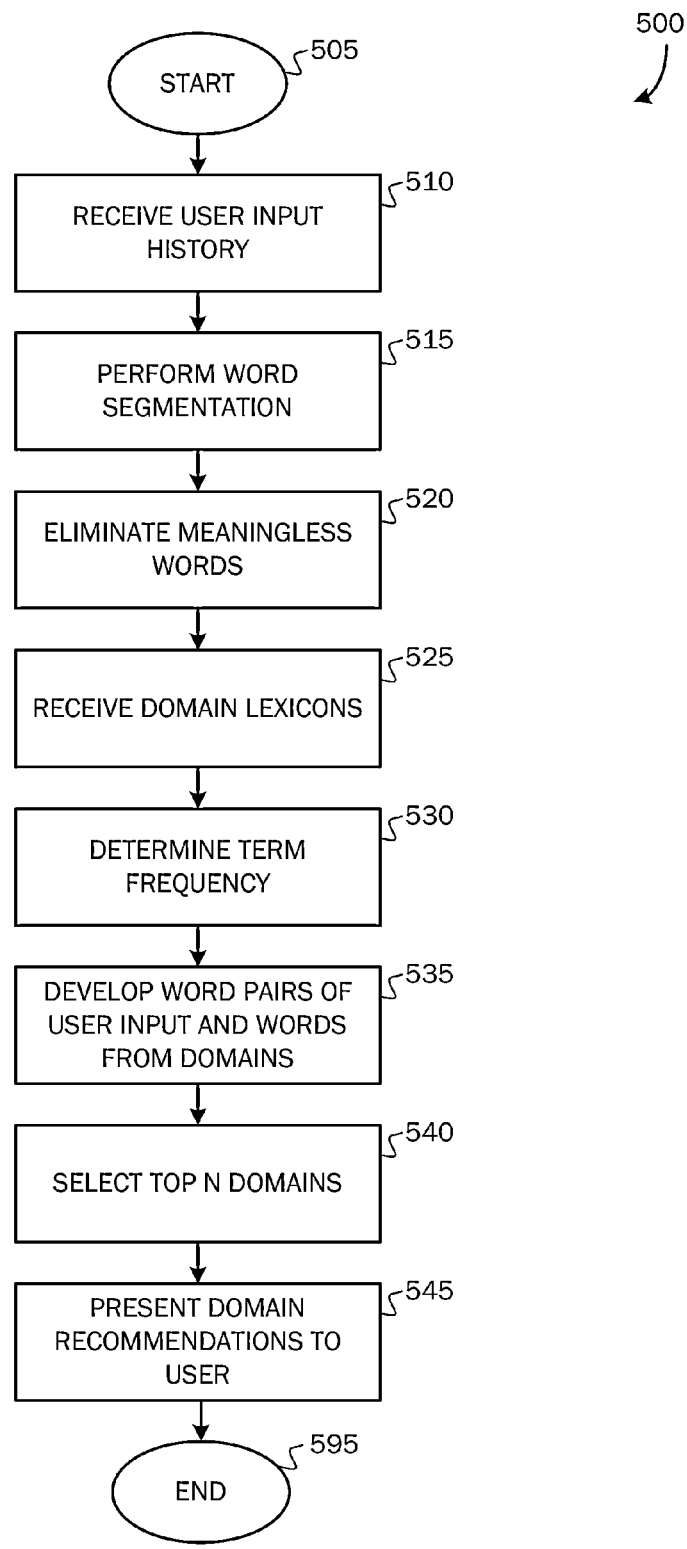
FIG. 5 is a flow chart of a method for recommending one or more domain dictionaries in association with received or input textual content.

FIG. 5 is a flow chart of a method for recommending one or more domain dictionaries in association with received or input textual content. The method 500 begins at start operation 505 and proceeds to operation 510 where textual content input and/or received by a user is received by the domain recommendation engine 445. According to an embodiment, domain words are extracted from user input history (including text presently being entered, previously entered text, or text received from one or more sources) for comparison with words contained in one or more domain dictionaries that may be recommended to the user for use with the user's input method.

At operation 515, word segmentation is performed for separating input or received textual content into individual words for subsequent comparison of segmented words against words contained in one or more domain dictionaries 420, 425, 430, 435. As should be appreciated, user input history may be broken into words for comparison against words contained in various domain dictionaries according to a variety of methods. For example, words may be isolated from user input according to the methods described above with reference to FIGS. 1-3. Alternatively, user input may be broken into words via one or more word breaker methods, for example, by breaking words at spaces between groupings of characters or before or after known head and tail characters.

According to some languages, for example, Chinese, traditional word breaking methods are less effective because spaces and other demarcation indicators are not provided between words. In such cases, other methods may be utilized for quickly grouping characters into words. According to one method, a positive maximum match method may be employed for segmenting such language types (e.g., Chinese) into words. The positive maximum match method is not sensitive to the size of a given lexicon. According to this method, characters are grouped together one by one up to a maximum number (e.g., 9 characters), and each grouping may be treated as a word for comparing against a lexicon for isolating the grouping as a word. Regardless of the method of segmenting textual content into words, once textual content is segmented into words, the segmented words may be compared against words contained in any number of domain dictionaries, as described below, for determining whether a given domain dictionary should be recommended to the user for associating with the user's current input method.

At operation 520, words having low value and/or low meaning with respect to a comparison against words contained in the one or more domain dictionaries may be eliminated. As should be appreciated, elimination of low value or meaningless words at operation 520 may be performed according to a variety of methods, including the word detection rules and methods 235 described above with reference to FIG. 2.

At operation 525, the domain dictionaries and associated lexicons 420, 425, 430, 435 available for association with the input and/or received textual content 415 are obtained by the domain recommendation engine 445. As should be appreciated, an almost limitless number of domain dictionaries may be obtained having associated lexicons related to many different topics and ideas.

At operation 530, the words segmented from the input and/or received textual content 415 are analyzed for term frequency by determining the frequency with which particular words are used in the input and/or received textual content 415. For example, if the word "texting" is included only once in the textual content 415, then that word will have a term frequency of one. On the other hand, if the word "texting" is used ten times in the textual content 415, then a term frequency of ten will be applied to that word. According to embodiments, if a given word has a low term frequency, that word may be discarded from further analysis for association with a particular domain dictionary. As should be appreciated, the term frequency utilized for determining the value of a given word for comparison against words contained in one or more domain dictionaries may be varied based on a variety of factors. For example, in some instances a particular word may have a low term frequency, but nonetheless may be kept for further analysis. For example, a word such as "penicillin" may have a low term frequency in a given textual content, but the word may be kept due to its uniqueness, for comparison against words in a medical terminology domain dictionary.

At operation 535, words extracted from the input and/or received textual content having a sufficiently high term frequency are compared against words contained in one or more different domain dictionaries. Word pairs are created by pairing words extracted from the input and/or received textual content with matching words contained in the one or more domain dictionaries considered by the domain recommendation engine 445. For example, if the word "penicillin" is extracted from the textual content 415, and is found to match the same word contained in a medical terminology domain dictionary 430, a word pair associating the textual content 415 entered and/or received by the user with the example medical terminology domain dictionary 430 is created.

At operation 540, all the compared domains are sorted and ranked according to the number of matched word pairs in the analyzed text content, and a top number of domain dictionaries is determined for words extracted from the input and/or received textual content 415. According to one embodiment, the top number (e.g., two) domains are selected as domain candidates to recommend based on a threshold count of matched word pairs between the received or input text content and the analyzed domain dictionaries. As should be appreciated, the threshold count of matched word pairs may be determined via experimentation and testing. An example and suitable algorithm for determining a top number of domain dictionaries is as follows.

$$\text{Score}(\text{text}, \text{domain}_i) = \sum_{k=1}^{n} tf(w_k \mid w_k \in \text{text}, w_k \in \text{domain}_i)$$

$$\text{Domains}(\text{text}) = \{\{d_i, d_j\}, \text{if Score}(\text{text}, d_i) >$$

$$\text{Score}(\text{text}, d_j) > \{\text{Score}(\text{text}, d_k) \mid k \in \{1 \sim 47\}, k \neq i, k \neq j\}$$

$$\text{and } \{\text{Score}(\text{text}, d_i) + \text{Score}(\text{text}, d_j) > \text{threshold}$$

$$\phi, \text{otherwise}$$

For example, all domain dictionaries containing a prescribed number of word pairs associated with the input and/or received textual content may be determined for recommendation to the user. For example, if the textual content input and/or received by the user contains a number of medical and scientific terms, then a number of word pairs may be determined for words extracted from the textual content 415 in comparison to both a medical terminology domain dictionary and a scientific terminology domain dictionary. Thus, both the example medical terminology domain dictionary and the scientific terminology domain dictionary may be selected as top domain dictionaries for recommendation to the user. On the other hand, if the analyzed textual content 415 has very few engineering terms, resulting in very few word pairs from the analyzed textual content 415 an example engineering terminology domain dictionary, then the example engineering domain dictionary may not be ranked highly for presentation to the user as a recommended domain dictionary.

As should be appreciated, the ranking of domain dictionaries for a possible recommendation to a user may be performed according to a variety of prescribed ranking levels. For example, it may be determined that any domain dictionary having five or more word pairs associated with an analyzed textual content 415 may be recommended to a user.

On the other hand, it may be determined that there must be more than 25 word pairings between a given domain dictionary and an analyzed textual content for recommendation of the associated domain dictionary.

At operation 545, one or more domain dictionaries may be recommended to the user for association with the user's software functionalities, for example, an input method in use by the user, or the one or more domain dictionaries may be recommended for association with one or more software applications, such as word processing applications, slide presentation applications, Internet browsing applications, and the like. That is, the one or more domain dictionaries may be recommended to the user to allow the user to perform his/her text input and/or editing more efficiently through the use of the recommended domain dictionaries that may help him with the words he enters or edits. An example recommendation user interface component is described below with reference to FIG. 6. The method 500 ends at operation 595.

Figure 6:
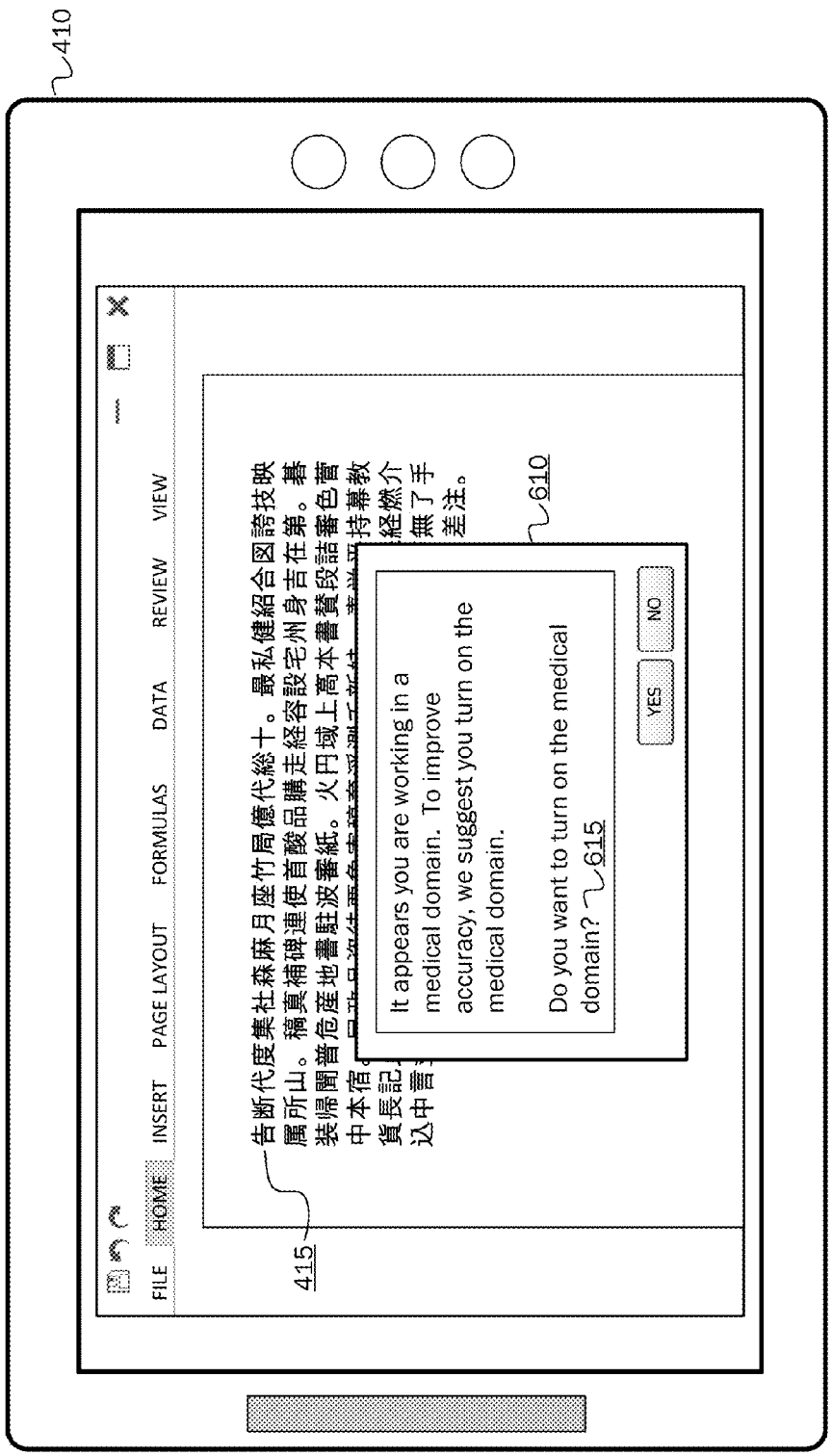
FIG. 6 illustrates an example pop-up dialog for recommending a domain dictionary to a user in association with received or entered textual content.

FIG. 6 illustrates an example pop-up dialog for recommending a domain dictionary to a user in association with received or entered textual content. As illustrated in FIG. 6, once one or more domain dictionaries are determined for recommendation to a user in association with a given software functionality and/or textual content, the one or more domain dictionaries may be recommended to the user by the domain dictionary recommendation engine 445. As illustrated in FIG. 6, a pop-up dialog 610 is illustrated for including a recommendation 615 of a given domain dictionary to the user. For example, the recommendation of "It appears you are working in a medical domain. To improve accuracy, we suggest you turn on the medical domain. Do you want to turn on the medical domain?" As illustrated, "Yes" and "No" buttons are provided for allowing a user to selectively turn on or reject the turning on of the recommended domain dictionary. As should be appreciated, the pop-up dialog 610 and the associated recommendation language are for purposes of example only and are not limiting of the vast number of user interface components that may be utilized for recommending a given domain dictionary in association with a given software functionality or textual content.

According to an alternate embodiment, once the recommendation engine 445 determines that a given domain dictionary may be recommended for use in association with a given software functionality and/or textual content, the recommended domain dictionary may be automatically associated with the given software functionality and/or textual content without user input. That is, some software functionalities, for example, input method applications and word processing applications, may be set up for automatically associating recommended domain dictionaries with textual content items for assisting users with those textual content items.

Once a given domain dictionary is associated with a given software functionality and/or textual content item, then the resources of that domain dictionary may be made available for use in association with textual content, including text input, spellchecking, grammar checking, auto entry completion, dictionary services, and the like.

Figure 7:
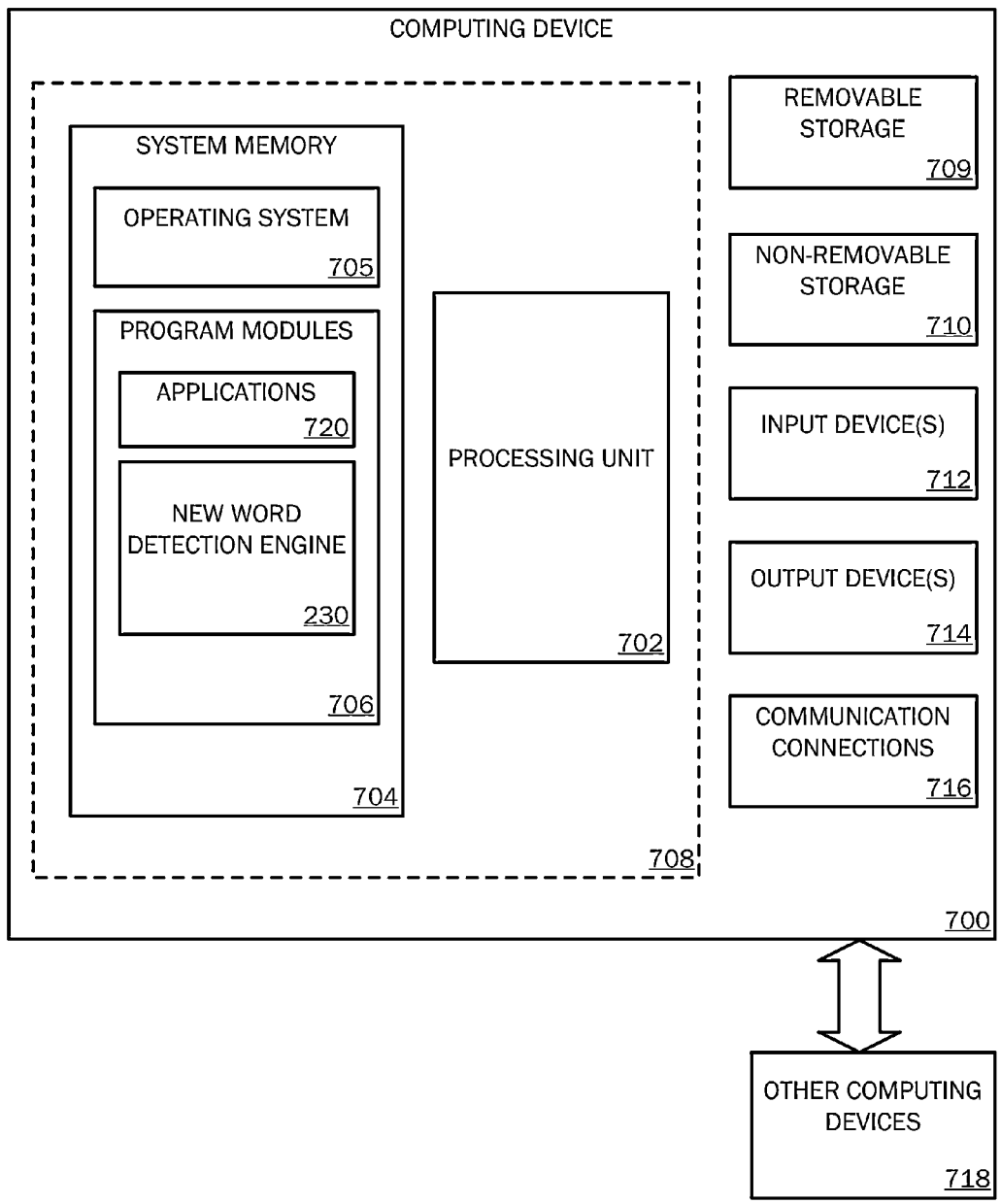
FIG. 7 is a simplified block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 7 through 9 and the associated descriptions provide a discussion of a variety of operating environments in which embodiments of the invention may be practiced. However, the devices and systems illustrated and discussed with respect to FIGS. 7 through 9 are for purposes of example and illustration and are not limiting of a vast number of computing device configurations that may be utilized for practicing embodiments of the invention, described herein.

FIG. 7 is a block diagram illustrating example physical components (i.e., hardware) of a computing device 700 with which embodiments of the invention may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the new word detection engine 230 and the domain recommendation engine 445. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706, such as the new word detection engine 230 and domain recommendation engine 445 may perform processes including, for example, one or more of the stages of the methods 300 and 500, respectively. The aforementioned process is an example, and the processing unit 702 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the new word detection engine 230 and the domain recommendation engine 445 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 704, the removable storage device 709, and the non-removable storage device 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 700. Any such computer storage media may be part of the computing device 700.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
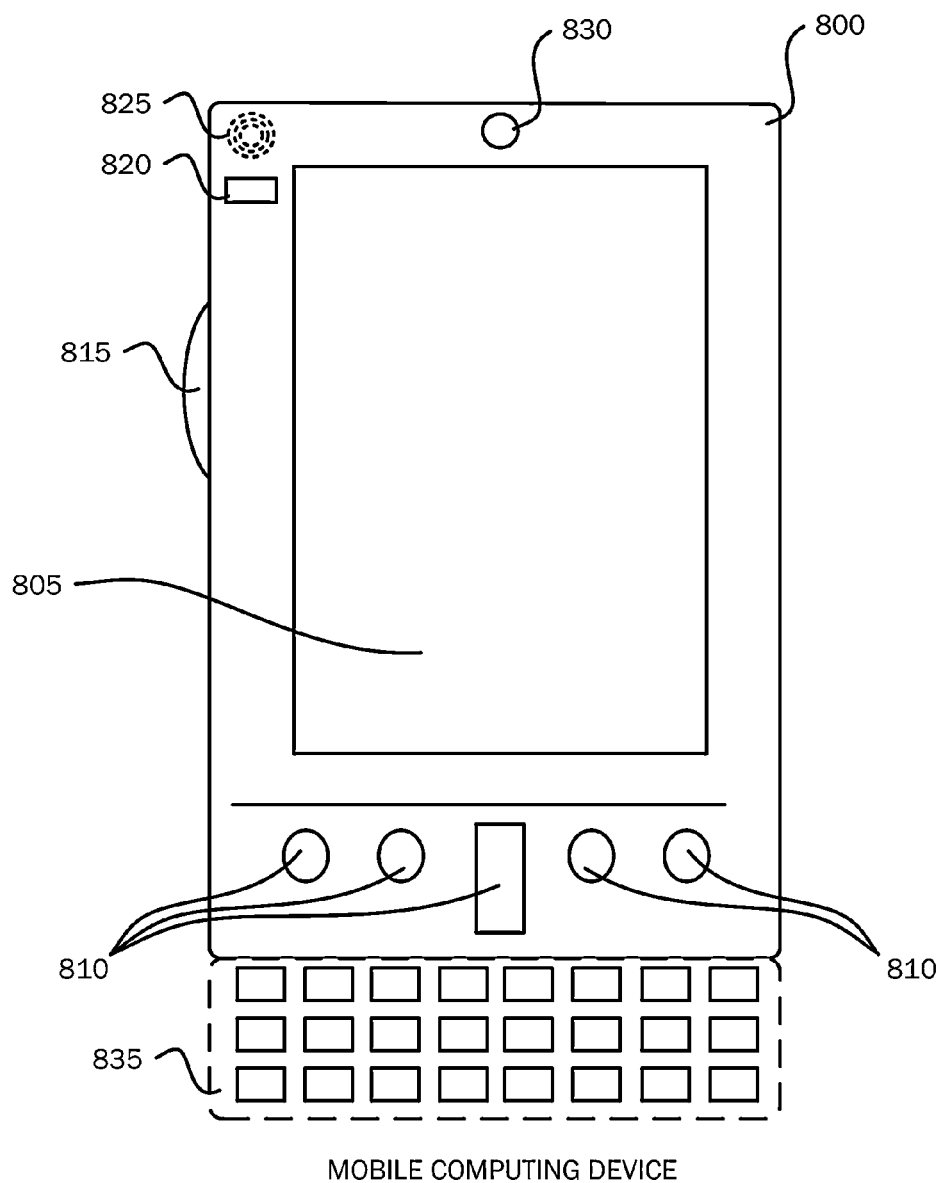
FIGS. 8A and 8B are simplified block diagrams of a mobile computing device with which embodiments of the present invention may be practiced.
Figure 8B:
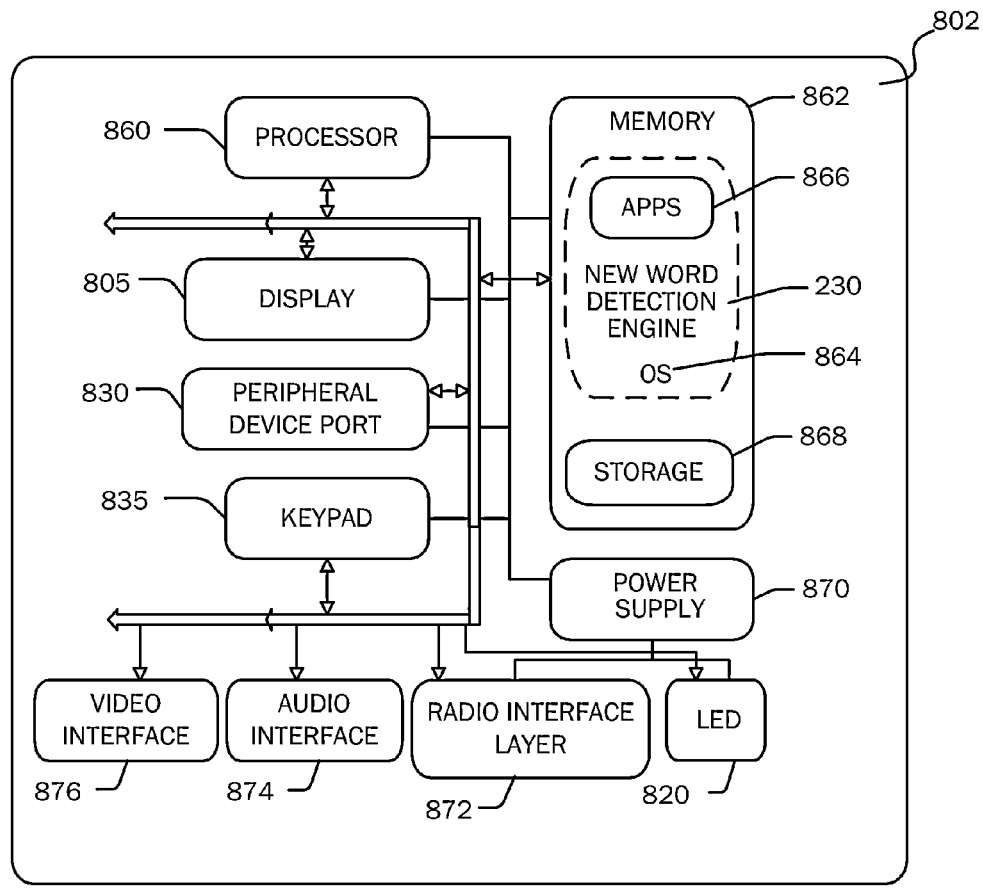
Figure 9:
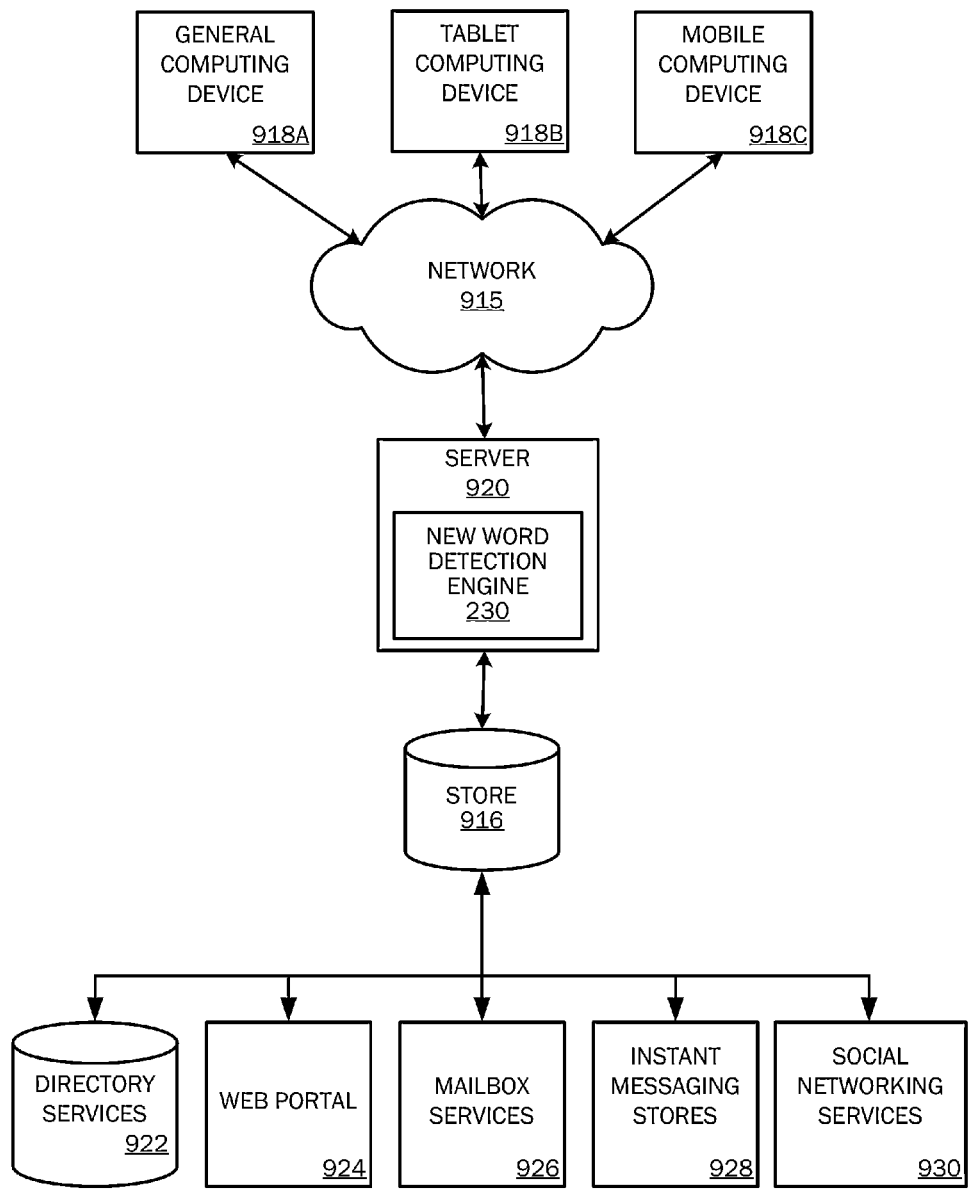
FIG. 9 is a simplified block diagram of a distributed computing system in which embodiments of the present invention may be practiced.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as electronic mail or other messages used by an electronic mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the new word detection engine 230 and domain recommendation engine 445, described herein.

The system 802 has a power supply 870, which may be implemented as one or more batteries. The power supply 870 might further include an external power source, such as an AC adapter or a powered docking cradle that supplements or recharges the batteries. The system 802 may also include a radio 872 that performs the function of transmitting and receiving radio frequency communications. The radio 872 facilitates wireless connectivity between the system 802 and the "outside world", via a communications carrier or service provider. Transmissions to and from the radio 872 are conducted under control of the operating system 864. In other words, communications received by the radio 872 may be disseminated to the application programs 866 via the operating system 864, and vice versa.

The radio 872 allows the system 802 to communicate with other computing devices, such as over a network. The radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 802 provides notifications using the visual indicator 820 that can be used to provide visual notifications and/or an audio interface 874 producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868. Computer storage media may include volatile and nonvolatile, removable and non-removable media implemented in any method or technology for storage of information, such as computer readable instructions, data structures, program modules, or other data.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing the functionality of the new word detection engine 230 and domain recommendation engine 445 to one or more client devices, as described above. Content developed, interacted with or edited in association with the new word detection engine 230 and domain recommendation engine 445 may be stored in different communication channels or other storage types. For example, various content and documents may be stored using a directory service 922, a web portal 924, a mailbox service 926, an instant messaging store 928, or a social networking site 930. The new word detection engine 230 and domain recommendation engine 445 may use any of these types of systems or the like for enabling co-authoring conflict resolution via comments, as described herein. As one example, the server 920 may be a web server providing the functionality of the new word detection engine 230 and domain recommendation engine 445 over the web. The server 920 may provide the functionality of the new word detection engine 230 and domain recommendation engine 445 over the web to clients through a network 915. By way of example, the client computing device 918 may be implemented as the computing device 900 and embodied in a personal computer 918*a*, a tablet computing device 918*b* and/or a mobile computing device 918*c* (e.g., a smart phone). Any of these embodiments of the client computing device 918 may obtain content from the store 916. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method of detecting a word for inclusion in one or more word lexicons; comprising:
   providing a computing device associated with a plurality of word lexicons;
   receiving a text selection from a source other than the computing device;
   displaying the text selection on a display of the computing device; and
   accessing a new word detection engine with the computing device, the new word detection engine configured for:
   extracting one or more words from the text selection;
   eliminating one or more of the extracted words where the eliminated one or more words are not considered valuable for inclusion in the given word lexicon;
   in response to eliminating one or more of the extracted words, then ranking a remaining one or more of the extracted words for inclusion in one or more of the plurality of word lexicons and selecting one or more of the remaining one or more of the extracted words for inclusion in one or more of the plurality of word lexicons based on a ranking applied to the selected one or more of the remaining one or more of the extracted words;
   comparing the selected one or more of the remaining one or more of the extracted words to the plurality of word lexicons; and
   in response to comparing the selected one or more of the remaining one or more of the extracted words, recommending at least one of the word lexicons for association with one or more software functionalities associated with the computing device for improving software functionality performance.

2. The method of claim 1, wherein receiving a text selection includes receiving a text input via text entry.

3. The method of claim 1, wherein receiving a text selection includes receiving a text selection from a remote source.

4. The method of claim 1, prior to extracting one or more words from the text selection, segmenting the received text selection into one or more words.

5. The method of claim 4, wherein segmenting the text selection into one or more words includes creating a plurality of character groupings from the text selection and comparing the plurality of character groupings with one or more word lexicons for determining whether any of the plurality of character groupings is a known word.

6. The method of claim 1, wherein eliminating one or more of the extracted words where the eliminated one or more words are not considered valuable for inclusion in the given word lexicon includes eliminating any stop words contained in the one or more of the extracted words.

7. The method of claim 1, wherein eliminating one or more of the extracted words where the eliminated one or more words are not considered valuable for inclusion in the given word lexicon includes eliminating one or more of the extracted words that are sub-strings of one or more other words already included in the given word lexicon.

8. The method of claim 1, wherein eliminating one or more of the extracted words where the eliminated one or more words are not considered valuable for inclusion in the given word lexicon includes eliminating one or more of the extracted words that are number sequences.

9. The method of claim 1, wherein ranking a remaining one or more of the extracted words for inclusion in the word lexicon includes scoring each of the remaining one or more of the extracted words according to one or more scoring attributes.

10. The method of claim 9, wherein scoring each of the remaining one or more of the extracted words according to one or more scoring attributes includes determining a term frequency for each of the remaining one or more of the extracted words in the received text content selection.

11. The method of claim 10, wherein scoring each of the remaining one or more of the extracted words according to one or more scoring attributes further includes measuring a contextual independency of each of the remaining one or more of the extracted words.

12. The method of claim 11, wherein scoring each of the remaining one or more of the extracted words according to one or more scoring attributes further includes determining whether a character pattern for each of the remaining one or more of the extracted words is more complete than any sub-strings that compose the each of the remaining words.

13. The method of claim 12, wherein scoring each of the remaining one or more of the extracted one or more words according to one or more scoring attributes further includes determining a frequency of any words neighboring each of the remaining one or more of the extracted one or more words.

14. The method of claim 13, wherein scoring each of the remaining one or more of the extracted one or more words according to one or more scoring attributes further includes determining a ratio of each of the remaining one or more of the extracted one or more words as a prefix or suffix to other of the remaining one or more of the extracted one or more words.

15. The method of claim 14, wherein scoring each of the remaining one or more of the extracted one or more words according to one or more scoring attributes further includes determining dependencies between each of the remaining one or more of the extracted one or more words with any other of the remaining one or more of the extracted one or more words.

16. The method of claim 1, wherein the ranking of the remaining one or more of the extracted words for inclusion in the word lexicon includes a scoring of each of the remaining one or more of the extracted words according to one or more scoring attributes.

17. The system of claim 16, wherein the scoring of each of the remaining one or more of the extracted words according to one or more scoring attributes includes a determination of a term frequency for each of the remaining one or more of the extracted words in the received text content selection.

18. A computer readable storage device containing computer executable instructions which when executed by a computer perform a method for detecting a word for inclusion in one or more word lexicons; comprising:
    associating a plurality of word lexicons with a computing device;
    receiving a text selection from a source other than the computing device;
    displaying the text selection on a display of the computing device; and
    accessing a new word detection engine with the computing device, the new word detection engine configured for:
    segmenting and extracting one or more words from the text content selection;
    eliminating one or more of the extracted words where the eliminated one or more words are not considered valuable for inclusion in the given word lexicon;
    in response to eliminating one or more of the extracted words, then ranking a remaining one or more of the extracted words for inclusion in the word lexicon including scoring each of the remaining one or more of the extracted words according to one or more scoring attributes and selecting one or more of the remaining one or more of the extracted words for inclusion in one or more of the plurality of word lexicons based on a ranking applied to the selected one or more of the remaining one or more of the extracted words;

comparing the selected one or more of the remaining one or more of the extracted words to the plurality of word lexicons; and in response to comparing the selected one or more of the remaining one or more of the extracted words, recommending at least one of the word lexicons for association with one or more software functionalities associated with the computing device for improving software functionality performance.

19. A system for detecting a word for inclusion in one or more word lexicons, comprising:

a computing device associated with a plurality of word lexicons;

a text selection from a source other than the computing device displayed on the computing device; and a new word detection engine accessible with the computing device;

one or more words extracted from the text selection by the new word detection engine;

one or more of the extracted words eliminated by the new word detection engine where the eliminated one or more words are not considered valuable for inclusion in the given word lexicon;

in response to the elimination of the one or more of the extracted words, a ranking of a remaining one or more of the extracted words for inclusion in one or more of the plurality of word lexicons and a selected one or more of the remaining one or more of the extracted words for inclusion in one or more of the plurality of word lexicons based on the ranking applied to the selected one or more of the remaining one or more of the extracted words;

a comparison of the selected one or more of the remaining one or more of the extracted words to the plurality of word lexicons; and in response to the comparison of the selected one or more of the remaining one or more of the extracted words, a recommendation of at least one of the word lexicons for association with one or more software functionalities associated with the computing device for improving software functionality performance.

20. The system of claim 19, wherein the text selection includes a text input via text entry.

21. The system of claim 19, wherein the text selection includes a text selection from a remote source.

22. The system of claim 19, wherein the text selection is segmented into one or more words prior to extracting one or more words from the text selection.

23. The system of claim 22, wherein the text selection is segmented into one or more words by creating a plurality of character groupings from the text selection and comparing the plurality of character groupings with one or more word lexicons to determine whether any of the plurality of character groupings is a known word.

24. The system of claim 19, wherein the eliminated one or more of the extracted words not considered valuable for inclusion in the given word lexicon were stop words contained in the one or more of the extracted words.

\* \* \* \* \*